(12) United States Patent
Sivertsen

(10) Patent No.: US 9,842,353 B1
(45) Date of Patent: Dec. 12, 2017

(54) TECHNIQUES OF CLAIMING ALL AVAILABLE TIMESLOTS IN MEDIA CONTENT MANAGEMENT AND DEPLOYMENT SYSTEM

(71) Applicant: AMERICAN MEGATRENDS, INC., Norcross, GA (US)

(72) Inventor: Clas Gerhard Sivertsen, Liburn, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 46 days.

(21) Appl. No.: 14/108,988

(22) Filed: Dec. 17, 2013

(51) Int. Cl.
*G06Q 30/00* (2012.01)
*G06Q 30/02* (2012.01)

(52) U.S. Cl.
CPC ..... *G06Q 30/0272* (2013.01); *G06Q 30/0273* (2013.01); *G06Q 30/0275* (2013.01)

(58) Field of Classification Search
CPC ............ G06C 30/0272; G06C 30/0273; G06C 30/0275
See application file for complete search history.

(56) References Cited

U.S. PATENT DOCUMENTS

| | | |
|---|---|---|
| 6,571,279 B1 | 5/2003 | Herz et al. |
| 7,146,567 B1 | 12/2006 | Duczmal et al. |
| 8,413,153 B2 | 4/2013 | Harris et al. |
| 2002/0013757 A1 | 1/2002 | Bykowsky et al. |
| 2003/0149601 A1 | 8/2003 | Cabral |
| 2004/0015399 A1 | 1/2004 | Maggio |
| 2004/0054589 A1 | 3/2004 | Nicholas et al. |
| 2004/0174597 A1* | 9/2004 | Craig et al. .................. 359/484 |
| 2007/0136133 A1 | 6/2007 | Li |
| 2007/0288350 A1 | 12/2007 | Bykowsky |
| 2009/0012868 A1* | 1/2009 | DeAngelis ...................... 705/14 |
| 2009/0030788 A1* | 1/2009 | Boudah et al. ................. 705/14 |
| 2009/0144157 A1* | 6/2009 | Saracino et al. ............... 705/14 |

(Continued)

OTHER PUBLICATIONS

Liu et al., "Interactive wireless electronic billboard", Proceedings of the 2004 IEEE Int'l Conf. on Networking, Sensing and Control, vol. 1, pp. 553-558, Mar. 2004.*

*Primary Examiner* — Amanda Abrahamson
*Assistant Examiner* — Scott C Anderson
(74) *Attorney, Agent, or Firm* — Locke Lord LLP; Tim Tingkang Xia, Esq.

(57) ABSTRACT

In certain aspects, a media content management and deployment system is provided. A data store stores data specifying available timeslots and locations of signage devices. A front end server sends a user input interface to a remote computing device. The user input interface receives campaign parameters from a user for building a campaign. A deployment module receives the campaign parameters, and examines data in the data store to select candidate signage devices and candidate timeslots of the candidate signage devices from the available timeslots. The user input interface then obtains and displays the candidate timeslots of candidate signage devices for displaying media content, and receives an instruction from the user to claim all of the candidate timeslots for the campaign. Upon receiving a request to claim all of the candidate timeslots, the deployment module generates campaign deployment plan data including data specifying the candidate timeslots and the candidate signage devices.

25 Claims, 6 Drawing Sheets

(56) References Cited

U.S. PATENT DOCUMENTS

| | | | |
|---|---|---|---|
| 2010/0191600 A1* | 7/2010 | Sideman | 705/14.53 |
| 2010/0332331 A1* | 12/2010 | Etchegoyen | G06Q 30/02 705/14.69 |
| 2011/0035287 A1 | 2/2011 | Fox | |
| 2011/0106618 A1* | 5/2011 | Ben-Moshe | 705/14.49 |
| 2011/0125588 A1 | 5/2011 | Turner et al. | |
| 2011/0178878 A1* | 7/2011 | Ballout | 705/14.69 |
| 2011/0214044 A1* | 9/2011 | Davis | G06T 11/00 715/201 |
| 2011/0282727 A1* | 11/2011 | Phan et al. | 705/14.36 |
| 2011/0288915 A1 | 11/2011 | Mochizuki | |
| 2012/0047020 A1 | 2/2012 | Bagherjeiran et al. | |
| 2012/0130855 A1 | 5/2012 | Nielsen et al. | |
| 2012/0150586 A1 | 6/2012 | Harper et al. | |
| 2013/0185162 A1 | 7/2013 | Mo | |
| 2013/0212619 A1 | 8/2013 | Yerli | |
| 2014/0028879 A1* | 1/2014 | Morino | G06T 5/007 348/241 |
| 2014/0067549 A1 | 3/2014 | Park et al. | |
| 2014/0122248 A1* | 5/2014 | Kuzama | G06Q 30/0269 705/14.66 |
| 2014/0222578 A1* | 8/2014 | Poornachandran et al. | 705/14.61 |

* cited by examiner

TECHNIQUES OF CLAIMING ALL AVAILABLE TIMESLOTS IN MEDIA CONTENT MANAGEMENT AND DEPLOYMENT SYSTEM

FIELD

The present disclosure relates generally to computer hardware and software systems for managing and distributing media content, and more particularly to techniques of claiming all available timeslots in systems for managing and distributing media content to networks of digital signage devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Traditionally, if an advertiser wanted to display content on each of the signage devices in the network, one option would be to physically deliver the content to a network administrator who would then upload the content to each of the signage devices individually. For example, an advertiser could mail a USB mass storage device (i.e., "thumb drive") to the network administer who would then upload the content at each signage device, where it could then be displayed. As will be understood and appreciated, such a process is both time consuming and difficult to manage as someone must walk from signage device to signage device while keeping track of each upload.

Therefore, there is a long-felt but unresolved need for a system for efficiently and effectively managing and delivering media content.

SUMMARY

Certain aspects of the present disclosure direct to a media content management and deployment system. In certain embodiments, the system includes: a data store having a processor and a memory, wherein the data store is configured to: store available timeslot information data specifying available timeslots of a plurality of signage devices, and store signage device information data specifying a location of each of the plurality of signage devices; a front end server configured to send a user input interface to a remote computing device, wherein the user input interface is configured to: allow a user to input first campaign parameters for building a first campaign, the first campaign parameters including time parameters and location parameters, obtain and display candidate timeslots of candidate signage devices for displaying media content, and allow the user to input an instruction to claim all of the candidate timeslots of the candidate signage devices for the first campaign; and a deployment module configured to: obtain the first campaign parameters, examine the signage device information data and the location parameters to select the candidate signage devices from the plurality of signage devices, examine the available timeslot information data and the time parameters to select the candidate timeslots of the candidate signage devices from the available timeslots, receive a request to claim all of the candidate timeslots of the candidate signage devices, and generate first campaign deployment plan data including data specifying the candidate timeslots and the candidate signage devices.

In certain embodiments, the available timeslot information data include sale timeslot information data specifying available timeslots of the plurality of signage devices and each for sale at a predetermined respective sale price. In certain embodiments, the system further includes a quotation calculator configured to obtain from the data store the sale price of a given timeslot for sale. In certain embodiments, the deployment module is configured to determine a first subset of the candidate timeslots each are for sale, obtain from the quotation calculator a sale price for each timeslot in the first subset, and calculate a total price including a cost for claiming all the timeslots in the first subset. In certain embodiments, the front end server is configured to obtain price data specifying the total price and send the price data to the user input interface, and instruct the user input interface to display an input option that allows the user to accept the total price for claiming all of the candidate timeslots of the candidate signage devices.

In certain embodiments, the data store is configured to store claimed timeslot information data specifying timeslots of the plurality of signage devices that are claimed by a campaign. In certain embodiments, the deployment module is configured to request the quotation calculator to claim a first timeslot in the first subset for the first campaign, and update the first campaign deployment plan data to include the first timeslot. In certain embodiments, the quotation calculator is configured to receive a request to claim the first timeslot for the first campaign, instruct the data store to update the claimed timeslot information data to specify that the first timeslot is claimed by the first campaign, and instruct the data store to update the sale timeslot information data to remove the first timeslot.

In certain embodiments, the available timeslot information data include bid timeslot information data specifying available timeslots of the plurality of signage devices and each for bidding at a respective bid price. In certain embodiments, the quotation calculator is configured to obtain from the data store the bid price of a given timeslot for bidding. In certain embodiments, the deployment module is configured to determine a second subset of the candidate timeslots each are for bidding, obtain from the quotation calculator a bid price for each timeslot in the second subset, and calculate the total price including a cost for placing bids on all the timeslots in the second subset. In certain embodiments, the front end server is configured to instruct the user input interface to display an input option that allows the user to accept the total price for claiming and placing bids on all of the candidate timeslots of the candidate signage devices.

In certain embodiments, the deployment module is configured to request the quotation calculator to place a bid on a second timeslot of the second subset for the first campaign. In certain embodiments, the quotation calculator is configured to receive a request to place the bid on the second timeslot for the first campaign, and instruct the data store to update the bid timeslot information data to specify that a bid for the first campaign is placed on the second timeslot.

In certain embodiments, the quotation calculator is configured to receive a request to place a bid on the second timeslot for a second campaign, and instruct the data store to update the bid timeslot information data to specify that a bid for the second campaign is placed on the second timeslot.

In certain embodiments, the data store is configured to store claimed timeslot information data specifying timeslots of the plurality of signage devices that are claimed by a campaign, wherein the bid timeslot information data specify a bid period for each of the timeslots for bidding. In certain embodiments, the quotation calculator is configured to examine the bid timeslot information data to determine whether the bid period for the second timeslot has expired, in response to determining that the bid period for the second timeslot has expired, instruct the data store to update the claimed timeslot information data to specify that the second timeslot is claimed by a winning campaign which placed a highest bid on the second timeslot, instruct the data store to update the bid timeslot information data to remove the second timeslot, and send to the deployment module data specifying the winning campaign and the second timeslot. In certain embodiments, the deployment module is configured to update a campaign deployment plan data of the winning campaign to include the second timeslot.

In certain embodiments, the quotation calculator is configured to send a notification to the deployment module, the notification specifying that the second campaign has placed a bid on the second timeslot higher than the bid placed on the second timeslot by the first campaign, and the deployment module is configured to, in response to the notification, request the quotation calculator to place another bid on the second timeslot for the first campaign, the another bid being higher than the bid placed by the second campaign.

In certain embodiments, the deployment module is configured to request the quotation calculator to claim each timeslot of the first subset for the first campaign, and request the quotation calculator to place a bid on each timeslot of the second subset for the first campaign.

In certain embodiments, the deployment module is configured to determine whether all the candidate timeslots have been successfully claimed for the first campaign.

Certain aspects of the present disclosure direct to a method of managing and deploying media content, including: storing, in a data store, available timeslot information data specifying available timeslots of a plurality of signage devices; storing, in the data store, signage device information data specifying a location of each of the plurality of signage devices; sending, from a front end server, a user input interface to a remote computing device, wherein the user input interface is configured to receive first campaign parameters from a user for building a first campaign, wherein the first campaign parameters comprise time parameters and location parameters, obtain and display candidate timeslots of candidate signage devices for displaying media content, and receive an instruction from the user to claim all of the candidate timeslots of the candidate signage devices for the first campaign; receiving, at a deployment module, the first campaign parameters from the user input interface executed at the remote computing device; examining, at the deployment module, the signage device information data and the location parameters to select the candidate signage devices from the plurality of signage devices; examining, at the deployment module, the available timeslot information data and the time parameters to select the candidate timeslots of the candidate signage devices from the available timeslots; receiving, at the deployment module, a request to claim all of the candidate timeslots of the candidate signage devices from the user input interface executed at the remote computing device, and generating, at the deployment module, first campaign deployment plan data including data specifying the candidate timeslots and the candidate signage devices.

In certain embodiments, the available timeslot information data comprises sale timeslot information data specifying available timeslots of the plurality of signage devices and each for sale at a predetermined respective sale price. In certain embodiments, the method further includes: obtaining, at a quotation calculator, a sale price of a given timeslot for sale from the data store; determining, at the deployment module, a first subset of the candidate timeslots each are for sale; obtaining, at the deployment module, the sale price for each timeslot in the first subset from the quotation calculator; calculating, at the deployment module, a total price including a cost for claiming all the timeslots in the first subset; obtaining, at the front end server, price data specifying the total price and send the price data to the user input interface, and instructing, by the front end server, the user input interface to display an input option that allows the user to accept the total price for claiming all of the candidate timeslots of the candidate signage devices.

In certain embodiments, the method further includes: storing, at the data store, claimed timeslot information data specifying timeslots of the plurality of signage devices that are claimed by a campaign; requesting, by the deployment module, the quotation calculator to claim a first timeslot in the first subset for the first campaign, wherein the quotation calculator is configured to receive a request to claim the first timeslot for the first campaign, instruct the data store to update the claimed timeslot information data to specify that the first timeslot is claimed by the first campaign, and instruct the data store to update the sale timeslot information data to remove the first timeslot; updating, at the deployment module, the first campaign deployment plan data to include the first timeslot; requesting, by the deployment module, the quotation calculator to claim each timeslot of the first subset for the first campaign, and requesting, by the deployment module, the quotation calculator to place a bid on each timeslot of the second subset for the first campaign.

In certain embodiments, the available timeslot information data include bid timeslot information data specifying available timeslots of the plurality of signage devices and each for bidding at a respective bid price. In certain embodiments, the method further includes:

obtaining, at the quotation calculator, the bid price of a given timeslot for bidding from the data store; determining, at the deployment module, a second subset of the candidate timeslots each are for bidding; obtaining, at the deployment module, a bid price for each timeslot in the second subset from the quotation calculator; calculating, at the deployment module, the total price including a cost for placing bids on all the timeslots in the second subset; and instructing, by the front end server, the user input interface to display an input option that allows the user to accept the total price for claiming and placing bids on all of the candidate timeslots of the candidate signage devices.

In certain embodiments, the method further includes: requesting, by the deployment module, the quotation calculator to place a bid on a second timeslot of the second subset for the first campaign; receiving, at the quotation calculator, a request to place the bid on the second timeslot for the first campaign and to place a bid on the second timeslot for a second campaign; and instructing, by the quotation calculator, the data store to update the bid timeslot information data to specify that a bid for the first campaign and a bid for the second campaign are placed on the second timeslot.

In certain embodiments, the method further includes: storing, at the data store, claimed timeslot information data specifying timeslots of the plurality of signage devices that are claimed by a campaign, wherein the bid timeslot information data specify a bid period for each of the timeslots for bidding; examining, at the quotation calculator, the bid timeslot information data to determine whether the bid period for the second timeslot has expired; in response to determining that the bid period for the second timeslot has expired, instructing, by the quotation calculator, the data store to update the claimed timeslot information data to specify that the second timeslot is claimed by a winning campaign which placed a highest bid on the second timeslot; instructing, by the quotation calculator, the data store to update the bid timeslot information data to remove the second timeslot; sending, by the quotation calculator, data specifying the winning campaign and the second timeslot to the deployment module; and updating, at the deployment module, a campaign deployment plan data of the winning campaign to include the second timeslot.

In certain embodiments, the method further includes: sending, by the quotation calculator, a notification to the deployment module, the notification specifying that the second campaign has placed a bid on the second timeslot higher than the bid placed on the second timeslot by the first campaign, and in response to the notification, requesting, by the deployment module, the quotation calculator to place another bid on the second timeslot for the first campaign, the another bid being higher than the bid placed by the second campaign.

In certain embodiments, the method further includes: determining, at the deployment module, whether all the candidate timeslots have been successfully claimed for the first campaign.

Certain aspects of the present disclosure direct to a non-transitory computer readable medium storing computer executable codes, wherein the codes includes: a data store, when executed at a processor, configured to store available timeslot information data specifying available timeslots of a plurality of signage devices, and store signage device information data specifying a location of each of the plurality of signage devices; a front end server, when executed at a processor, configured to send a user input interface to a remote computing device, wherein the user input interface is configured to receive first campaign parameters from a user for building a first campaign, wherein the first campaign parameters comprise time parameters and location parameters, obtain and display candidate timeslots of candidate signage devices for displaying media content, and receive an instruction from the user to claim all of the candidate timeslots of the candidate signage devices for the first campaign; and a deployment module, when executed at the processor, configured to receive the first campaign parameters from the user input interface executed at the remote computing device, examine the signage device information data and the location parameters to select the candidate signage devices from the plurality of signage devices, examine the available timeslot information data and the time parameters to select the candidate timeslots of the candidate signage devices from the available timeslots, receive a request to claim all of the candidate timeslots of the candidate signage devices from the user input interface executed at the remote computing device, and generate first campaign deployment plan data including data specifying the candidate timeslots and the candidate signage devices.

In certain embodiments, the available timeslot information data include sale timeslot information data specifying available timeslots of the plurality of signage devices and each for sale at a predetermined respective sale price. In certain embodiments, the codes further include a quotation calculator configured to obtain from the data store the sale price of a given timeslot for sale. In certain embodiments, the deployment module is configured to determine a first subset of the candidate timeslots each are for sale, obtain from the quotation calculator a sale price for each timeslot in the first subset, and calculate a total price including a cost for claiming all the timeslots in the first subset. In certain embodiments, the front end server is configured to obtain price data specifying the total price and send the price data to the user input interface, and instruct the user input interface to display a input option that allows the user to accept the total price for claiming all of the candidate timeslots of the candidate signage devices.

In certain embodiments, the data store is configured to store claimed timeslot information data specifying timeslots of the plurality of signage devices that are claimed by a campaign. In certain embodiments, the deployment module is configured to request the quotation calculator to claim a first timeslot in the first subset for the first campaign, update the first campaign deployment plan data to include the first timeslot, request the quotation calculator to claim each timeslot of the first subset for the first campaign, and request the quotation calculator to place a bid on each timeslot of the second subset for the first campaign. In certain embodiments, the quotation calculator is configured to receive a request to claim the first timeslot for the first campaign, instruct the data store to update the claimed timeslot information data to specify that the first timeslot is claimed by the first campaign, and instruct the data store to update the sale timeslot information data to remove the first timeslot.

In certain embodiments, the available timeslot information data include bid timeslot information data specifying available timeslots of the plurality of signage devices and each for bidding at a respective bid price. In certain embodiments, the quotation calculator is configured to obtain from the data store the bid price of a given timeslot for bidding. In certain embodiments, the deployment module is configured to determine a second subset of the candidate timeslots each are for bidding, obtain from the quotation calculator a bid price for each timeslot in the second subset, and calculate the total price including a cost for placing bids on all the timeslots in the second subset. In certain embodiments, the front end server is configured to instruct the user input interface to display a input option that allows the user to accept the total price for claiming and placing bids on all of the candidate timeslots of the candidate signage devices.

In certain embodiments, the deployment module is configured to request the quotation calculator to place a bid on a second timeslot of the second subset for the first campaign. In certain embodiments, the quotation calculator is configured to receive a request to place a bid on the second timeslot for the first campaign and a bid on the second timeslot for a second campaign, and instruct the data store to update the bid timeslot information data to specify that a bid for the first campaign and a bid for the second campaign are placed on the second timeslot.

In certain embodiments, the data store is configured to store claimed timeslot information data specifying timeslots of the plurality of signage devices that are claimed by a campaign, wherein the bid timeslot information data specify a bid period for each of the timeslots for bidding. In certain embodiments, the quotation calculator is configured to examine the bid timeslot information data to determine whether the bid period for the second timeslot has expired, in response to determining that the bid period for the second timeslot has expired, instruct the data store to update the claimed timeslot information data to specify that the second timeslot is claimed by a winning campaign which placed a highest bid on the second timeslot, instruct the data store to update the bid timeslot information data to remove the second timeslot, send to the deployment module data specifying the winning campaign and the second timeslot, and send a notification to the deployment module, the notification specifying that the second campaign has placed a bid on the second timeslot higher than the bid placed on the second timeslot by the first campaign. In certain embodiments, the deployment module is configured to update a campaign deployment plan data of the winning campaign to include the second timeslot, and in response to the notification, request the quotation calculator to place another bid on the second timeslot for the first campaign, the another bid being higher than the bid placed by the second campaign.

In certain embodiments, the deployment module is configured to determine whether all the candidate timeslots have been successfully claimed for the first campaign.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
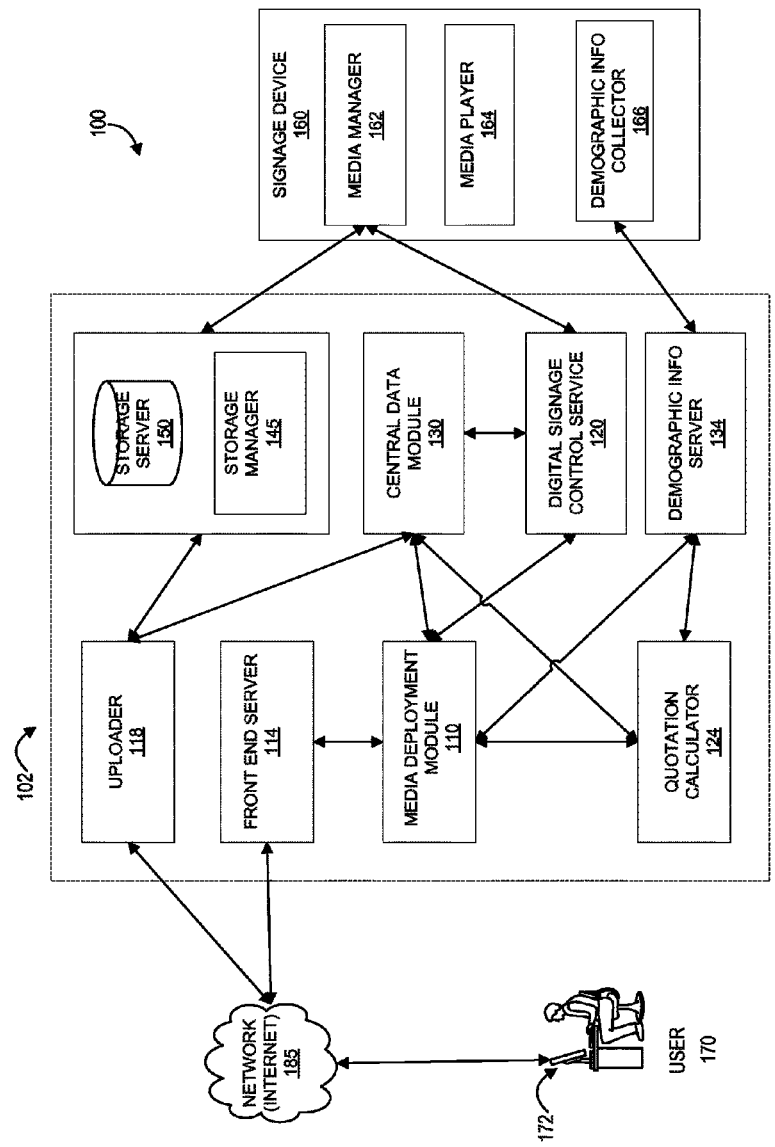
FIG. 1 schematically shows a media content management and deployment system in accordance with certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

FIG. 1 schematically shows a media content management and deployment system 100 in accordance with certain embodiments of the present disclosure. As shown, users 170 can utilize a management application 172 such as a web browser on a remote computing device to access the media content management cloud system 102, which are in communication with one or more signage devices 160. The media content management cloud system 102 include one or more front end servers 114, one or more uploader modules 118, one or more media deployment modules 110, one or more quotation calculators 124, one or more central data modules 130, one or more digital signage control services (DSCSs) 120, one or more demographic information servers 134, one or more storage servers 150, and one or more storage managers 145.

In certain embodiments, the remote computing device may be a regular computer or a special purpose computer with wired or wireless network connectivity, such as a desktop computer or a laptop computer, or a mobile communication device, such as a smart phone or a tablet computer with wired or wireless network connectivity.

The front end server 114 provides various user interfaces to the users 170. The users 170 can use those user interfaces to interact and communicate with the media content management cloud system 102. For example, the front end server 114 can provide different user interfaces to advertisers 170, signage device owners 170, and company users 170. The term user 170 below refers to the advertisers 170, the signage device owners 170, and the company users 170, unless otherwise noted.

Upon receiving a request a web browser 172 operated by a user 170, the front end server 114 can generate a user webpage and then transmit the user webpage to the browser.

The advertisers 170 can use the user webpage to create one or more advertisement campaigns. In general, an advertisement campaigns refers to displaying various media content items at various locations (signage devices 160) at various times for promoting or marketing a product or service. For example, a user 170 can create a campaign to promote a new beverage. This campaign can involve displaying a video commercial on all signage devices 160 in a shopping mall in New York City every Saturday from 2 PM to 4 PM in December this year as well as displaying a poster image on signage devices 160 at 5 major intersections of New York City every day in December this year.

In certain embodiments, initially the user webpage can allow a user 170 browse all the signage devices 160 managed by the media content management cloud system 102 and browse all the available time slots of each managed signage device 160. For example, the user webpage can allow a user 170 to browse signage devices 160 at different geographic location levels such as country, state/province, city, and street/intersection, etc. When the user 170 clicks a city name (e.g. New York City), the user webpage sends a request to the front end server 114 for identifiers of all the streets that have managed signage devices 160 in that city. The front end server 114, upon receipt of a geographic location identifier (e.g. New York City), can query the media deployment module 110 to retrieve the geographic location identifiers at the next level (e.g., street names). As will be described below, the media deployment module 110 can return a data object including the geographic location identifiers at the next level back to the front end server 114.

In certain embodiments, for each geographic location, the user webpage provides the user 170 options of browsing all the managed signage devices 160 in that the geographic location or going to a different level of locations. Therefore, the front end server 114 can use a geographic location identifier to query the media deployment module 110 information regarding all managed signage devices 160 at the particular location associated with the geographic location identifier. As will be described below, the media deployment module 110 can return a data object including information of all signage devices 160 at the particular location.

In certain embodiments, the front end server 114 can request from the media deployment module 110 the available time slot and the price information from the central data module 130 using the signage device ID. For example, the front end server 114 can request the information for each signage device 160 at the particular location. As will be described below, the media deployment module 110 can return one or more data objects including information regarding available time slots and the price for a particular signage device 160.

In certain embodiments, after receiving the signage device information and the available time slot and the price information, the front end server 114 can send one or more data objects including that information to the web browser 172. The browser can display information of all the signage devices 160 at the particular location and the available time slot and price information for each signage device 160.

Subsequently, the user 170 can decide to claim one or more particular timeslots of one or more particular signage devices 160 for the campaign that the user 170 is building. For example, after the user 170 chooses the timeslot at the browser, the browser sends the timeslot and signage device information to the front end server 114. The front end server 114, in turn, instructs the media deployment module 110 to claim the specified time slot of the particular signage device 160 for the user 170, which can be identified by a user ID. As will be described below, the media deployment module 110 communicates with the other components of the media content management cloud system 102 in order to claim the specified timeslot. After the media deployment module 110 has successfully claimed the timeslot, it can send a confirmation to the front end server 114. The front end server 114, in turn, can send that confirmation to the web browser 172.

In certain embodiments, the user webpage also allows the user 170 to input parameters of the campaign that the user 170 is building. For example, the campaign parameters can include time parameters specifying the desired time period (e.g., afternoon in May and June) for displaying media content. The time parameters can also specify the desired lengths of time slots and the least number of timeslots should be available in a duration (e.g., ten five-minute timeslots should be available in each 24-hour period) at a signage device 160.

The campaign parameters can include location parameters specifying the desired locations of the signage devices 160.

For example, the user webpage can also allow a user 170 to specify a particular zone (e.g., New York City) for a campaign.

Further, the campaign parameters can include target and avoidance demographic parameters, each of which can specify one or more of gender, age, ethnicity, height, skin color, hair color, hair length, facial hair, weight, static/in motion, accessories, stroller, glasses, beard, tie, brief-case, and suitcase attributes.

Further, the campaign parameters can include signage device parameters that specify the desired size, resolution, 3D capabilities, audio capabilities, etc.

Further, the campaign parameters can include budget information. For example, the user 170 can input the maximum amount of fund to be spent on the entire campaign, a geographic zone, a time period, or timeslots on a single signage device 160, etc. The campaign parameters can also include fund allocation parameters that specify how the budget should be allocated among different areas, time periods, media formats, the target demographics, etc.

After the user 170 has input one or more of the above campaign parameters, the browser can construct a campaign parameters data object and send it to the front end server 114 and requests the media content management cloud system 102 select timeslots and signage devices 160 that satisfy the user 170's requirements.

The front end server 114, after receiving the campaign parameter data object, sends the object to the media deployment module 110. As will be described below, the media deployment module 110 communicates with the other components of the media content management cloud system 102 to determine the candidate signage devices 160 and timeslots as well as the price information for each candidate timeslot.

In certain embodiments, the front end server 114 receives information from the media deployment module 110 that multiple signage devices 160 belongs to a signage device 160 group. For example, the signage devices 160 of a group can belong to the same private network (e.g., in a shopping mall). The signage devices 160 of a group can belong to the same owner.

The media deployment module 110 can select a subset of the candidate timeslots of the candidate signage devices 160 to create a proposed campaign timeslot plan. The front end server 114 receives a data object including the candidate timeslot information and the default selections. The front end server 114 can send a data object containing the information to the web browser 172. Accordingly, the web browser 172 can display the candidate timeslots and the default selections to the user 170.

Further, in certain embodiments, the media content management cloud system 102 can provide timeslots for sale or for bidding. Therefore, the price information obtained from the media deployment module 110 also includes indications that a particular timeslot is for sale or for bidding and the indications that the price is the current sale price or the current bidding price.

The user 170 can input selections of timeslots and signage devices 160 through the web browser 172. For the timeslots for sale, the user 170's selections indicate that the user 170 desires to buy those timeslots. For the timeslots for bidding, the user 170's input can also include a bid price or a maximum bid price and indicate that the user 170's desire to participate in the bidding process for the selected timeslots. The web browser 172 can send the user 170's selections and inputs to the front end server 114 through one or more data objects.

The front end server 114 receives the data objects from the web browser 172 and accordingly communicates with the media deployment module 110 to claim the selected timeslots for sale and to bid the selected timeslots for bidding.

During the bidding process, the front end server 114 may receive notifications from the media deployment module 110 that one or more selected timeslots for bidding have received higher bids from other users 170. The information received, e.g., through one or more data objects, from the media deployment module 110 can include the signage device ID, the timeslot that is outbid, the bidding price of the other user 170, the bidding price that needs to be offered in order to take the timeslot back. The front end server 114 sends the information to the web browser 172, which accordingly display the information to the user 170. Through the process described above, the user 170 can input another bidding price through the web browser 172 and continue bidding the timeslot in the media content management cloud system 102.

In certain embodiments, the front end server 114 can receive a request from the media deployment module 110 to increase the budget for the campaign. The front end server 114 accordingly transmits the request to the web browser 172, which asks the user 170 to input a higher budget or deny the request.

Further, in certain embodiments, the front end server 114 can request the candidate timeslots and signage devices 160 from the media deployment module 110 again and send that information to the web browser 172. The web browser 172 accordingly displays those candidate timeslots and signage devices 160 to the user 170. Therefore, when an initial choice of the timeslot for bidding is outbid by another user 170, the user 170 can choose other candidate timeslots and signage devices 160 and forgo the initial choice.

In certain embodiments, the user 170 can instruct to buy or bid on signage devices 160 that belong to the same one or more groups. The web browser 172 can additionally send one or more group IDs identifying the one or more groups to the front end server 114. The front end server 114 can subsequently instruct the media deployment module 110 to buy or bid the timeslots of the selected groups of signage devices 160.

In certain embodiments, the webpage displayed by the web browser 172 can have a function that allows a user 170 to claim all available candidate timeslots for sale or to bid all the available timeslots for bidding. After the user 170 selects that choice, the web browser 172 transmits instructions to the front end server 114 to get total price information of all the available candidate timeslots. The front end server 114, after receiving the instructions, can query the media deployment module 110 for the total price information to claim and bid all the candidate timeslots. Once receiving the price information, the front end server 114 sends that information to the web browser 172, which subsequently display the price information to the user 170 and asks the user 170 to confirm claiming and bidding all of the candidate timeslots at the given price. Once the front end server 114 receives confirmation from the web browser 172, it can request the media deployment module 110 to claim and bid all of the candidates timeslots. As will be described below, the media deployment module 110 communicates with the other components of the media content management cloud system 102 in order to claim and bid all the candidates timeslots.

In certain embodiments, the front end server 114 can also request demographic information for a location from the media deployment module 110. As will be described below, the media deployment module 110 communicates with other components of the media content management cloud system 102 to obtain the demographic information and returns, e.g., through one or more data objects, the requested demographic information to the front end server 114. The front end server 114 thus can, in addition to sending the candidate signage devices 160 information, send to the web browser 172 demographic information of the locations of the candidate signage devices 160. The demographic information can include gender, age, ethnicity, height, skin color, hair color, hair length, facial hair, weight, static/in motion, accessories, stroller, glasses, beard, tie, brief-case, and suitcase attributes.

The web browser 172 will accordingly can display the demographic information along with the candidate signage devices 160 to the user 170. The user 170 therefore can take the demographic information into consideration when selecting signage devices 160 for the campaign.

Once the media deployment module 110 has successfully claimed the selected timeslots for the user 170 either through direct purchase or bidding, the media deployment module 110 can send information regarding the claimed timeslots to the front end server 114. The front end server 114 accordingly sends the information to the web browser 172. The web browser 172 can display the claimed timeslots as well as the media content available to the user 170. Through the web browser 172, the user 170 can assign a particular media file containing the desired media content to a claim timeslot.

In certain documents, as will be described below, the front end server 114 can request all the content items or a subset of the content items that are available to the user 170. The front end server 114 can request the content item information from the media deployment module 110 using a user ID identifying the user 170. As will be described below, the media deployment module 110 communicates with other components of the media content management cloud system 102 to obtain the requested content items and returns that information to the front end server 114 through one or more data objects.

Each content item specifies information about a piece of media content and can include one or more of: a content ID identifying the content item, an owner ID specifying the owner of the content item, a list of approved user IDs specifying the users who are approved to use the media content item, the list of approved usages of the media content item (e.g. approved for display in a shopping mall and airport), content metadata specifying for example the title of the media content (e.g. shampoo advertisement video No. 1), the product or service promoted in the media content (e.g., shampoo), the category of the product or service (e.g., health and beauty), the manufacturer of the product or provider of the service (e.g., company A). The content item can also specify one or more media files. The content item can include file IDs identifying the media files and file metadata describing each media file. The file metadata can include one or more of: the title of the media file, the size of the media file, the format of the media file (e.g., H.264), and 3D information. The content item can also include storage links indicating storage locations in the media content management cloud system 102 for each media file. Further, the content item can specify the target and avoidance demographic as described above for the media content. The target and avoidance demographic information each can indicate the gender, age, ethnicity, height, skin color, hair color, hair length, facial hair, weight, static/in motion, accessories, stroller, glasses, beard, tie, brief-case, and suitcase attributes.

After receiving the information, the front end server 114 sends that information to the web browser 172. The web browser 172 accordingly displays the available content items to the user 170. Therefore, through the web browser 172, the user 170 can select a media file containing the desired media content to one or more claimed timeslots. The web browser 172 can transmit the user 170's input to the front end server 114 through one or more data objects.

In certain embodiments, the front end server 114, after receiving the information, accordingly requests the media deployment module 110 to assign the selected media files to the selected timeslots. In certain embodiments, the front end server 114 can send parameters such as the content ID, the file ID, the timeslot information, and the signage device ID to the media deployment module 110. As will be described below, the media deployment module 110 communicates with other components of the media content management cloud system 102 in order to assign the selected media files to the selected timeslots. After completion, the media deployment module 110 sends information regarding the successively assigned media files and timeslots to the front end server 114. The front end server 114 accordingly transmits the information to the web browser 172.

In certain embodiments, a signage device 160 may be divided into multiple sections and each section can be considered as an independent logical signage device 160. For example, a large signage device display screen can be divided into 4 sections: upper left, upper right, lower left, and the lower right. The above described techniques can be similarly utilized to deploy media files to timeslots of the sections (logical signage devices 160). In certain embodiments, the signage device IDs can be adapted to indicate a particular section of a particular signage device 160. In certain embodiments, the signage device information can be modified to further include section information such as section IDs.

In certain embodiments, after successfully assigning media files to timeslots for one or more campaigns, the user 170 can instruct the media content management cloud system 102 to deploy a particular campaign through the web browser 172. The web browser 172 can transmit a deployment instruction and one or more campaign IDs to the front end server 114. The front end server 114 accordingly requests the media deployment module 110 to deploy those campaigns.

In certain embodiments, the front end server 114 can provide an uploading interface to the web browser 172. The user 170 can use the uploading interface to upload a media content file to the media content management cloud system 102. For each media file, the user 170 can specify information of the media content item contained in the media file as well as information of the media file. For example, the user 170 can specify the owner of the content item, the approved users of the content item, the approved usage of the content item, content metadata specifying for example the title of the media content (e.g. shampoo advertisement video No. 1), the product or service promoted in the media content (e.g., shampoo), the category of the product or service (e.g., health and beauty), the manufacturer of the product or provider of the service (e.g., company A). Further, the user 170 can specify the target demographic of the content item as described above for the media content. The target demographic information can indicate the desired gender, age, ethnicity, height, skin color, hair color, hair length, facial hair, weight, static/in motion, accessories, stroller, glasses, beard, tie, brief-case, and suitcase attributes.

Further, regarding the media file, the user 170 can specify file metadata including one or more of: the title of the media file, the size of the media file, the format of the media file (e.g., H.264), and 3D information.

Subsequently, the web browser 172 can open an upload stream with the uploader module 118 and upload the media content/file information and the media file to the uploader module 118.

In certain embodiments, the uploader module 118 can receive a media file and the associated media content/file information from the web browser 172. The uploader module 118 can convert the received media files to a different format. For instance, if the media file uploaded by the advertiser is a 2D media file with resolution at 1080p and a predetermined display dimension, the uploader module 118 may convert the 2D media file into different kinds of display type (2D or 3D), resolutions, and display dimensions (scale up or scale down). In certain embodiments, the uploader module 118 can convert all media files received into H.264 format. Further, upon the user 170's request, the uploader module 118 can convert 2D media files into 3D media files. When a user 170 uploads a 3D media file, the uploader module 118 can generate another 2D media file based on the 3D media file.

The uploader module 118 then can save one or more of the original media file and the converted media files into the storage server 150. As will be described below, the storage server 150 returns a storage link identifying the storage location for each of the media files.

Further, using the media content/file information received from the web browser 172, the information of the converted media files, the storage links received from the storage server 150, the uploader module 118 can create a content item data object and store the content item in the content item data collection of the central data module 130.

The conversion function of the uploader module 118 is advantageous because not all the signage devices 160 share the same 3D capability, resolution, and display dimensions. After the conversion, the media deployment module 110 may only associate the converted media files with the signage devices 160 that have the appropriate 3D capability, resolution, and display dimensions. The conversion capability of the uploader module 118 can eliminate the need for each signage device 160 to convert the original media files to an appropriate file version that is suitable to the particular signage device 160.

In certain embodiments, the media deployment module 110 can receive a request from the front end server 114 for geographic information of a particular location. For example, the media deployment module 110 can receive a geographic identifier at a particular level (e.g., a city name) and a request for geographic identifiers in the next level (e.g., street names). The media deployment module 110 can retrieve the requested information from the central data module 130. As will be described below, the central data module 130 can include a geographic data collection that includes information of all the geographic areas having managed signage devices 160. The media deployment module 110 can query the central data module 130 for any particular geographic information. Once the media deployment module 110 receives the geographic data from the central data module 130, it sends the requested geographic information to the front end server 114.

In certain documents, the media deployment module 110 can receive requests from the front end server 114 regarding signage devices 160 at a particular location. Accordingly, the media deployment module 110 can retrieve the requested information from the central data module 130. As will be described below, the central data module 130 can have a signage device 160 data collection containing detailed data specifying each managed signage device 160. The detailed data can include a geographic location identifier indicating the location of the signage device 160. After receiving the query, the central data module 130 can return a list of signage device IDs indicating the signage devices 160 as well as brief description of the signage devices 160 located at the particular location. The media deployment module 110 can send those data to the front end server 114 through one or more data objects.

In certain embodiments, the media deployment module 110 can receive a request from the front end server 114 querying the timeslots for sale or for bidding of a particular signage device 160. The media deployment module 110 can retrieve the requested information from the central data module 130. As will be described below, the central data module 130 can have a sale timeslot data collection containing detailed data specifying the available timeslots for sale for each managed signage device 160. The central data module 130 can also have a bid timeslot data collection containing detailed data specifying the available timeslots for bidding for each managed signage device 160. After receiving the query, the central data module 130 can return information regarding available timeslots to the media deployment module 110. Once the media deployment module 110 receives the information regarding available timeslots, it sends the information to the front end server 114 through one or more data objects.

In certain embodiments, the media deployment module 110 receives the campaign parameters from the front end server 114 and accordingly determines a campaign deployment plan for the campaign. Based on the location parameters of the campaign parameters, the media deployment module 110 can query the central data module 130 to obtain information of candidate signage devices 160 located at the desired locations. Based on the time parameters, the media deployment module 110 can query the central data module 130 to obtain information of candidate timeslots of the candidate signage devices 160.

In certain embodiments, the campaign parameters include the target demographic parameters. Using the target demographic parameters, the media deployment module 110 can query the demographic information server 134 for locations and time periods at which the target demographic presents. Using the target locations, the media deployment module 110 can query the central data module 130 to obtain information of candidate signage devices 160 located at the desired target locations. Using the target time periods, the media deployment module 110 can query the central data module 130 to obtain information of candidate timeslots within the target time periods. Where the campaign parameters also contain the location and time parameters, those parameters can be used to further limit the candidate signage devices 160 locations and timeslots. The media deployment module 110 can also obtain information from the central data module 130 about whether each of the candidate timeslots is for sale or for bidding.

Further, the media deployment module 110 can query the quotation calculator 124 for price information of each candidate timeslot. As will be described below, the quotation calculator 124 can communicate with other components of the media content management cloud system 102 in order to obtain the requested price information of the candidate timeslots. Subsequently, the media deployment module 110 receives the price information from the quotation calculator 124.

Further, the campaign parameters can include signage device parameters. The media deployment module 110 can query the central data module 130 to obtain detailed information specifying each signage device 160. The media deployment module 110 can eliminate the signage devices 160 that do not meet the requirements specified by the signage device parameters (e.g., screen size and 3D capabilities, and popularity).

Further, the campaign parameters can include budget information. The media deployment module 110 can employ one or more logic components to determine one or more sets of the candidate signage devices 160 and timeslots that that meet the budget requirement.

After determining the candidate signage devices 160 and the candidate timeslots as well as their prices, the media deployment module 110 can send the information to the front end server 114 through one or more data objects.

In certain embodiments, the media deployment module 110 receives the user 170's instruction to claim and bid the selected timeslots of the selected signage devices 160.

The media deployment module 110 can save that information into the central data module 130 as a proposed campaign deployment plan. For example, the campaign deployment plan can include a campaign ID identifying the campaign for which the deployment plan is created. The campaign deployment plan can also include one or more deployment entries. Each deployment entry can include one or more of a content ID identifying a particular content item, a file ID identifying a particular media file of the content item, the signage ID identifying a signage device 160 to which the media file is to be deployed, a group ID identifying the group of signage devices 160 to which the media file is to be deployed, timeslot information indicating when the media content should be displayed at the signage devices 160.

More specifically, a campaign deployment plan identifies particular deployment information. This deployment information can include a group ID, which identifies which group of digital signage devices 160 have been selected to display the campaign, and/or a signage device ID, which identifies a specific signage device 160 selected to display the campaign. For example, the group of signage devices 160 can all belong to a private network. The deployment information can also include one or more content IDs identifying the one or more media files to be displayed at the selected timeslots of the selected signage devices 160. A user can create a campaign that displays the same one or more media files in one or more groups of signage devices 160. Alternatively, a user can create a campaign having a single media file to be displayed a single time on a single signage device 160.

Additionally, according to one embodiment, the deployment information can include time slot information, which indicates the date(s) and time(s) when the campaign is to be displayed. Again, a user could create a long-running campaign in which content is to be displayed multiple times each day for an entire month. Alternatively, a user could create a campaign to appear on a single signage device 160 at a specific time. For example, and individual could create a campaign consisting of a "FURNITURE ON SALE" message that is to run on a particular signage device 160, on a particular date, at a particular time. Finally, in one embodiment, the deployment information may include a content ID that identifies the particular media content (e.g., a single "FURNITURE ON SALE" message, a 60-second soft drink commercial, etc.).

In certain embodiments, the media deployment module 110 receives requests from the front end server 114 for claiming selected timeslots of the selected signage devices 160. Accordingly, the media deployment module 110 requests the quotation calculator 124 to claim those timeslots. For example, the media deployment module 110 can send the user 170's user ID, the signage devices 160 IDs, the timeslot information, and the price information. As will be described in detail later, the quotation calculator 124 communicates with other components of the media content management cloud system 102 in order to claim those timeslots for the user 170.

In certain embodiments, the media deployment module 110 receives requests from the front end server 114 for bidding selected timeslots of the selected signage devices 160. Accordingly, the media deployment module 110 requests the quotation calculator 124 to bid those timeslots. For example, the media deployment module 110 can send the user 170's user ID, the signage devices 160 IDs, the timeslot information, and the price information. As will be described in detail later, the quotation calculator 124 communicates with other components of the media content management cloud system 102 in order to bid those timeslots for the user 170.

In certain embodiments, the media deployment module 110 can receive a notification of outbidding from the quotation calculator 124. The notification informs the media deployment module 110 that another user 170 has offered a higher price for the particular timeslot for bidding. The notification can include signage device ID, the timeslot information, the price offered by this user 170, the price offered by the other user 170, and the next bid price. Accordingly, the media deployment module 110 sends the information to the front end server 114.

Subsequently, the media deployment module 110 can receive a request from the front end server 114 indicating that this user 170 has offered a higher bid price for the particular timeslot. The media deployment module 110 accordingly can put another bid on the particular timeslot for this user 170 through the quotation calculator 124.

In certain embodiments, when the media deployment module 110 receives the outbidding notification, it can utilize the one or more logic component to determine whether the budget requirement of the user 170 allows bidding again on the outbid timeslot or whether the fund allocation parameters direct the media deployment module 110 to forgo the outbid timeslot and instead to bid on another selected candidate timeslot. In these circumstances, the media deployment module 110 can modify the proposed campaign deployment plan stored in the central data module 130 for example by deleting the outbid timeslot and adding the new selected candidate timeslot.

In certain embodiments, when the media deployment module 110 determines that the current budget requirement does not allow bidding the outbid timeslot at a higher price, the media deployment module 110 can send a request to increase budget to the front end server 114. The media deployment module 110 subsequently receives either a higher budget or a disapproval of the request. The media deployment module 110 can accordingly put a higher bid on the outbid timeslot or revise the proposed campaign deployment plan.

In certain embodiments, the media deployment module 110 can receive a notification that the bidding process for a particular timeslot is complete. The notification can further indicate whether the user 170 has won the bid and the final bidding price. If the user 170 has won the bid, the media deployment module 110 can finalize the entry for that particular timeslot in the proposed campaign deployment plan, for example, by writing an indicator and the final bidding price.

In certain embodiments, the media deployment module 110 can receive a request from the front end server 114 to claim and bid on all the candidate timeslots of the candidate signage devices 160. Accordingly, the media deployment module 110 can utilize the operations described above to claim and bid on all the candidate timeslots.

In certain embodiments, after receiving a notification of completion for each of the timeslots for bidding in the proposed campaign deployment plan, the media deployment module 110 can finalize the timeslots in the proposed campaign deployment plan. In other words, the proposed campaign deployment plan now has a record of all the timeslots of the signage devices 160 claimed by the user 170, through purchase or bidding, for this campaign. The proposed campaign deployment plan can include signage device IDs and group IDs of the signage devices 160 to indicate to what signage devices 160 the timeslots belong to. The media deployment module 110 can revise the proposed campaign deployment plan in the central data module 130 accordingly.

In certain embodiments, after the timeslots for the campaign is finalized, the media deployment module 110 can send the timeslot information to the front end server 114. In addition, the media deployment module 110 can receive a request from the front end server 114 for content items. The media deployment module 110 can retrieve the requested information from the central data module 130. As will be described below, the central data module 130 can have a content item data collection containing detailed the data specifying each of the media content items stored and managed in the media content management cloud system 102. In certain embodiments, the central data module 130 can store a collection of the content items as described above. The media deployment module 110 can query the central data module 130 with the user 170's user ID to retrieve all of the content items that is available to the user 170. The media deployment module 110 can also query the central data module 130 with some additional parameters (e.g., the length of the video content) to retrieve a subset of the content items available to the user 170. Subsequently, the media deployment module 110 can return the requested content items to the front end server 114.

The media deployment module 110 can receive user instructions from the front end server 114 to assign a particular media file of a particular media content item to a particular timeslot of a particular signage device 160. The media deployment module 110 can accordingly add the content item ID, the media file ID, the media file storage link, and other information to the proposed campaign deployment plan.

In certain embodiments, the media deployment module 110 can query the demographic information server 134 to obtain timeslot demographic information of one or more of the claimed timeslots of the campaign. The media deployment module 110 can compare the timeslot demographic information with the target demographic information of the content items available to the user 170 and use one or more logic components to determine a content item whose target demographic suits the predicted demographic of the particular claimed timeslot. The media deployment module 110 can also compare the timeslot demographic information with the avoidance demographic information of the content items available to the user 170 and use one or more logic components to determine content items that should not be assigned to the particular claimed timeslot. If the selected media item has more than one media files stored in the storage server 150, the media deployment module 110 can further retrieve the signage device information from the central data module 130 and determine a suitable media file for display on the signage device 160 by comparing the media display capabilities of the signage device 160 with the media display requirements of the media files. The media deployment module 110 can accordingly add the content item ID, the media file ID, the media file storage link, and other information of the selected content item to the proposed campaign deployment plan.

After the media deployment module 110 has assigned media files to each of the claimed timeslots, the media deployment module 110 can finalize the campaign deployment plan for the campaign. The finalized campaign deployment plan can include a campaign ID identifying the campaign for which the deployment plan is created. The campaign deployment plan can also include one or more deployment entries. Each deployment entry can include one or more of a content ID identifying a particular content item, a file ID identifying a particular media file of the content item, the signage ID identifying a signage device 160 to which the media file is to be deployed, a group ID identifying the group of signage devices 160 to which the media file is to be deployed, timeslot information indicating when the media content should be displayed at the signage devices 160. The media deployment module 110 can store the finalized campaign deployment plan to the central data module 130 (for example by changing the proposed campaign deployment plan to a finalized campaign deployment plan by adding a indication of such a status).

In certain embodiments, the media deployment module 110 can also add the content information (e.g., content ID) and the file information (e.g., file ID, storage links) of each claimed timeslot to the claimed timeslots data collection.

The media deployment module 110 can return the finalized campaign deployment plan to the front end server 114 upon request. The front end server 114 can send the finalized campaign deployment plan to the web browser 172 for the user 170's approval.

In certain embodiments, the media deployment module 110 can receive a request to deploy one or more campaigns from the front end server 114. The media deployment module 110 accordingly sends one or more deployment instructions to the DSCS 120. The DSCS 120 communicates with the other components of the media content management cloud system 102 to deploy media files to various signage devices 160 according to the finalized campaign deployment plans of the one or more campaigns.

In certain embodiments, the quotation calculator 124 can calculate the sale price of the timeslots for sale or the starting bid price of the timeslots for bidding. As will be described below, the central data module 130 can have a sale timeslot data collection containing detailed data specifying the available timeslots for sale for each managed signage device 160. The data can specify a signage device ID, timeslot information, and the price for that particular timeslot. The central data module 130 can also have a bid timeslot data collection containing detailed data specifying the available timeslots for bidding for each managed signage device 160. The data can specify a signage device ID, timeslot information, and the starting bid price for that particular timeslot, and an increment of bid.

For example, the quotation calculator 124 can retrieve signage device information of a particular signage device 160 from the central data module 130. As will be described below, the central data module 130 can have a signage device 160 data collection containing detailed data specifying each managed signage device 160. The detailed data can include for example the size of the signage screen, the location of the signage device 160, the popularity of signage device 160, and 3D capabilities. Further, the quotation calculator 124 can also query the demographic information server 134 for demographic information of a timeslot at the location of the signage device 160.

Based on the above factors, the quotation calculator 124 can utilize a price logic component to determine a sale price or initial bidding price for the timeslots of the signage devices 160 or sections of the signage devices 160. The price adjustment can also be made based on a signage device 160's occupancy factors. The price adjustment can be also made based on the demand of a particular advertisement time slot of the signage device 160. Alternatively, the price adjustment can be made based on the demand of the signage device 160's entire advertisement time slots. If the demand of the signage device 160 increases, the price of using it becomes higher. If the demand of the signage device 160 decreases, the price of using it becomes lower.

In certain embodiments, the quotation calculator 124 writes a sale price for a particular timeslot to the sale timeslot data collection in the central data module 130. The quotation calculator 124 writes a bid price to the bid timeslot data collection in the central data module 130.

In certain embodiments, the quotation calculator 124 can receive a request from the media deployment module 110 for price information of a particular timeslot of a particular signage device 160. The request can include the timeslot information and a signage device ID. Using that information, the quotation calculator 124 can query the sale timeslot data collection or the bid timeslot data collection of the central data module 130 to determine the sale price or bid price of the timeslot.

In certain embodiments, the quotation calculator 124 can receive a request to claim a particular timeslot for sale. The request can include a campaign ID identifying for which campaign the particular timeslot is claimed, the sign device ID, the timeslot information, and the sale price claiming the timeslot. Using that information, the quotation calculator 124 can update the claimed timeslot data collection of the central data module 130 by adding an entry including the signage device ID, the timeslot information, the sale price, the campaign ID. The information in the claimed timeslot data collection indicates that a particular timeslot of a particular signage device 160 is claimed by a campaign at a particular price. In certain embodiments, after an entry has been added in the claimed timeslot data collection, the corresponding entry in the sale timeslot data collection can be removed.

In certain embodiments, the quotation calculator 124 can receive a request to place a bid on a particular timeslot. The request can include a campaign ID identifying for which campaign a bid is placed on the particular timeslot, the signage device ID, the timeslot information, and the bid price. Using that information, the quotation calculator 124 can update the bid timeslot data collection by updating the bid price, the campaign ID, the bidder (user) ID, in the entry of the particular timeslot. Further, by reading the data of the entry of the particular timeslot, the quotation calculator 124 can determine whether the timeslot has been offered a bid by another user 170 (e.g., through the bidder ID). When the current user 170 outbid another user 170, the quotation calculator 124 can send a outbid notification including the signage device ID, the timeslot information, the price offered by the other user 170, the current price offered by this user 170, and the next bid price.

In certain embodiments, the quotation calculator 124 can periodically scan the timeslot data collection to determine whether the bid period for any timeslot has expired. As will be described below, in certain embodiments, the data timeslot data collection includes bidding period information for each timeslot for bidding. By examining that information, the quotation calculator 124 can determine whether the bid for a timeslot is closed.

Once the quotation calculator 124 determines that the bidding for a particular timeslot is closed, the quotation calculator 124 can update the claimed timeslot data collection by adding an entry including the signage device ID, the timeslot information, the sale price, the campaign ID. The information in the claimed timeslot data collection indicates that a particular timeslot of a particular signage device 160 is claimed by a campaign at a particular price. In certain embodiments, after an entry has been added in the claimed timeslot data collection, the corresponding entry in the bid timeslot data collection can be removed.

Further, the quotation calculator 124 can send a bid completion notification to the media deployment module 110. The notification can indicate a winning bidders ID, the campaign ID, the signage ID, the timeslot information, and the final sale price.

In certain embodiments, the central data module 130 can include a geographic data collection. The geographic data collection contains data specifying all the geographic areas having managed signage devices 160. The data can include geographic identifiers geographic locations at a different level such as country, state/province, city, and street/intersection.

In certain embodiments, the central data module 130 can have a content item data collection containing detailed the data specifying each of the media content items stored and managed in the media content management cloud system 102. Each content item in the data collection can specify information about a piece of media content and can include one or more of: a content ID identifying the content item, an owner ID specifying the owner of the content item, a list of approved user IDs specifying the users who are approved to use the media content item, the list of approved usages of the media content item (e.g. approved for display in a shopping mall and airport), content metadata specifying for example the title of the media content (e.g. shampoo advertisement video No. 1), the product or service promoted in the media content (e.g., shampoo), the category of the product or service (e.g., health and beauty), the manufacturer of the product or provider of the service (e.g., company A). The content item can also specify one or more media files. The content item can include file IDs identifying the media files and file metadata describing each media file. The file metadata can include one or more of: the title of the media file, the size of the media file, the format of the media file (e.g., H.264), and 3D information. The content item can also include storage links indicating storage locations in the media content management cloud system 102 for each media file. Further, the content item can specify the target demographic as described above for the media content. The target demographic information can indicate the desired gender, age, ethnicity, height, skin color, hair color, hair length, facial hair, weight, static/in motion, accessories, stroller, glasses, beard, tie, brief-case, and suitcase attributes.

In certain embodiments, the central data module 130 can have a signage device 160 data collection containing detailed data specifying each managed signage device 160. The detailed data can include a geographic location identifier indicating the location of the signage device 160. The detailed data can include for example the size of the signage screen, the location of the signage device 160, the popularity of signage device 160, and 3D capabilities, and the layout configuration information such as sections of the screen.

A signage owner may own multiple signage devices 160 at different locations. To identify the signage devices 160, the signage owner may set up information for each signage device 160 with a particular signage device ID, a particular name of the signage, and the geographic location identifier describing the location of the signage device 160. Further, the central data module 130 stores the layout configuration files and the corresponding signage device IDs.

Further, the central data module 130 can store a collection of data specifying campaign deployment plans as discussed above for each campaign. Further, data relating to a particular campaign deployment plan can be organized in a particular campaign-deployment-plan data object. For example, data relating to a particular campaign deployment plan can include one or more of: a campaign ID identifying the campaign to which the particular deployment plan is directed, and one or more deployment entries. Each deployment entry can specify a content ID identifying a media file that is to be deployed, a group ID identifying the group of signage devices 160 to which a media file should be deployed or a signage device ID identifying a particular signage device 160 to which a media file should be deployed, and a timeslot in which the deployed media file should be displayed.

In certain embodiments, the central data module 130 can have a sale timeslot data collection containing detailed data specifying the available timeslots for sale for each managed signage device 160. The data can specify the signage device ID, timeslot information, and the price for that particular timeslot. For example, the data can specify that the timeslot from 2 PM to 4 PM on a particular day of a particular signage device 160 at Times Square in New York City is available for sale at a particular price.

In certain embodiments, the central data module 130 can also have a bid timeslot data collection containing detailed data specifying the available timeslots for bidding for each managed signage device 160. The data can specify the signage device ID, the bidding period (i.e., when the bidding should start and finish), the bid price, the campaign ID, and the bidder (user) ID.

In certain embodiments, the central data module 130 can include a claimed timeslot data collection containing detailed data specifying the timeslots claimed by each campaign or user 170. For each claimed timeslot the data includes the signage device ID, the timeslot information, the sale price, the campaign ID, the content ID, the file ID, the storage Link. The information in the claimed timeslot data collection indicates that a particular timeslot of a particular signage device 160 is claimed by a campaign at a particular price.

The digital signage control service ("DSCS") 120 is in communication with each of the signage devices 160. As described above, the DSCS 120 can receive a campaign deployment instruction from the media deployment module 110. The campaign deployment instruction informs the DSCS 120 that a specific campaign is ready to be deployed to the intended signage devices 160. The DSCS 120 then can obtain a campaign deployment plan for that specific campaign. Based on the campaign deployment plan, the DSCS 120 can determine what media files should be distributed to which signage devices 160. Using the content IDs specified in the campaign deployment plan, the DSCS 120 can inquire the central data module 130 to obtain a storage link that can be used to retrieve the corresponding media file from the storage server 150. Then, the next time a signage device 160 inquires the DSCS 120 whether there is any media file to be delivered to that signage device 160, the DSCS 120 can inform the signage device 160 of the media files and the associated storage links of the media files.

In certain embodiments, the media deployment module 110 instructs the DSCS 120 that a particular campaign is ready to be deployed by sending a campaign ID to the DSCS 120 in a message. Using the campaign ID, the DSCS 120 can retrieve a campaign deployment plan from the central data module 130. As described above, the campaign deployment plan specifies detail information regarding a particular campaign such as what media files should be played at which signage device 160 at which timeslots. In certain embodiments, a signage device 160 can periodically send requests to the DSCS 120 to check if there are media files or program lists available to that signage device 160. The DSCS 120, in turn, can examine the campaign deployment plan to determine whether a media file is to be deployed to that signage device 160 and then informs the results to the signage device 160. In certain embodiments, the DSCS 120 can generate a program list or an update of the program list for a particular signage device 160. Upon inquiry from the signage device 160, the DSCS 120 can send the program list or the update to the signage device 160.

In certain embodiments, the storage server 150 provides a mechanism to allow other components of the media content management cloud system 102 to store data objects in the storage server 150. For example, the storage server 150 can provide a write function that another component can call to pass on a data object. After receiving the data object, the storage server 150 stores the data object and generates a storage link identifying the stored data object. The storage server 150 can return the storage link back to the component requesting to store the data object. The storage server 150 can further provide a read function that another component can call to retrieve a data objects stored in the storage server 150 using a storage link. As stated, the storage server 150 can retrieve the data object identified by the storage link and return the retrieved data object back to the component requesting to retrieve the data object.

In certain embodiments, the storage server 150 operates in conjunction with a storage manager 145 to provide a distributed mechanism to deliver media files stored in the storage server 150 to signage devices 160. As has been discussed, each signage device 160 periodically queries the DSCS 120 to check if any media file is ready to be deployed to that signage device 160. As discussed above, the DSCS 120 checks the current campaign deployment plan to determine whether there is any media file to be deployed to the inquiring signage device 160. As discussed, the DSCS 120 may also check the current campaign deployment plan to determine whether payment has been remitted in relation to the plan. When there is a media file to be deployed, the DSCS 120 returns, among other things, the storage link of the media file. The storage link indicates the location of the storage manager and the data object identifier identifying the media file stored in the storage server 150. Subsequently, the storage manager 145 can then receive from a signage device 160 a request for a particular media file using a storage link. Based on the request, the storage manager 145 can then assist in the process of delivering the content to the signage device 160.

Figure 2A:
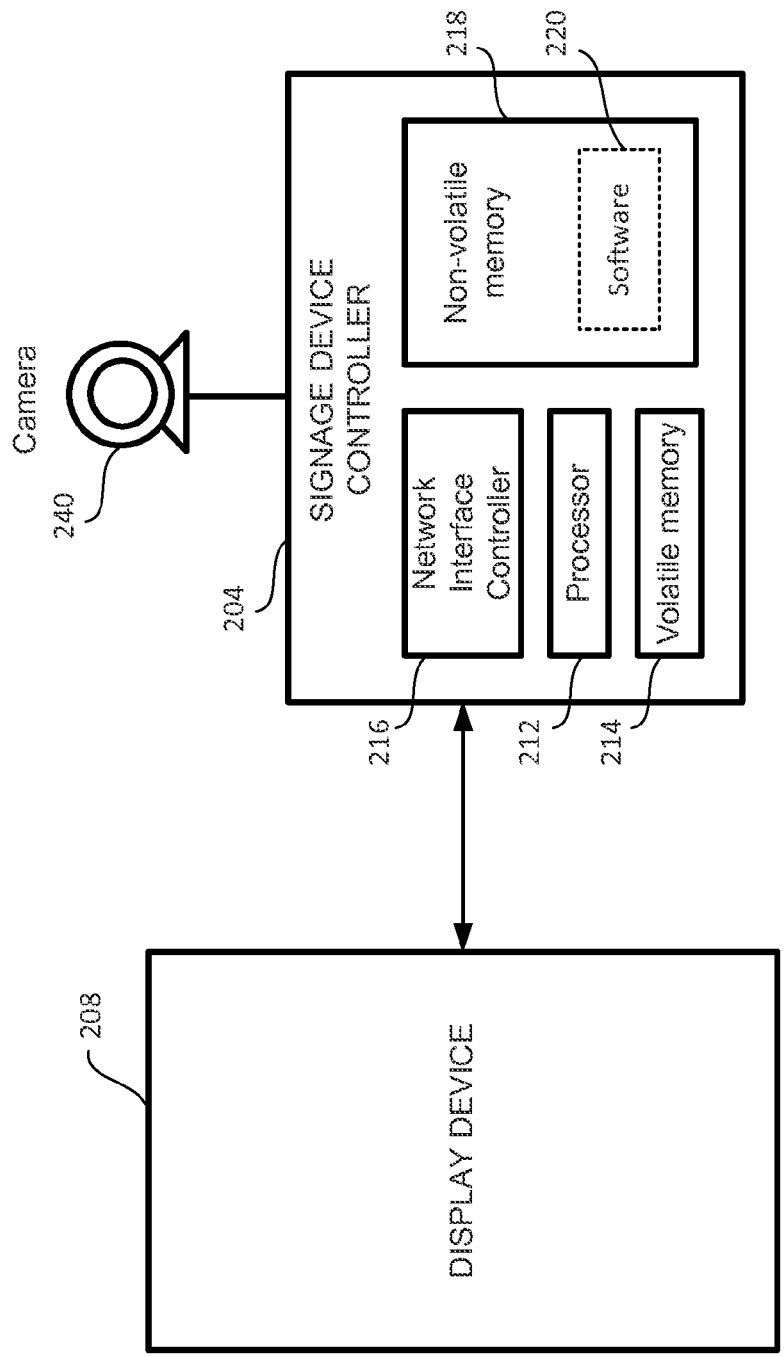
FIG. 2A schematically shows a digital signage device 160 in accordance with certain embodiments of the present disclosure.
Figure 2B:
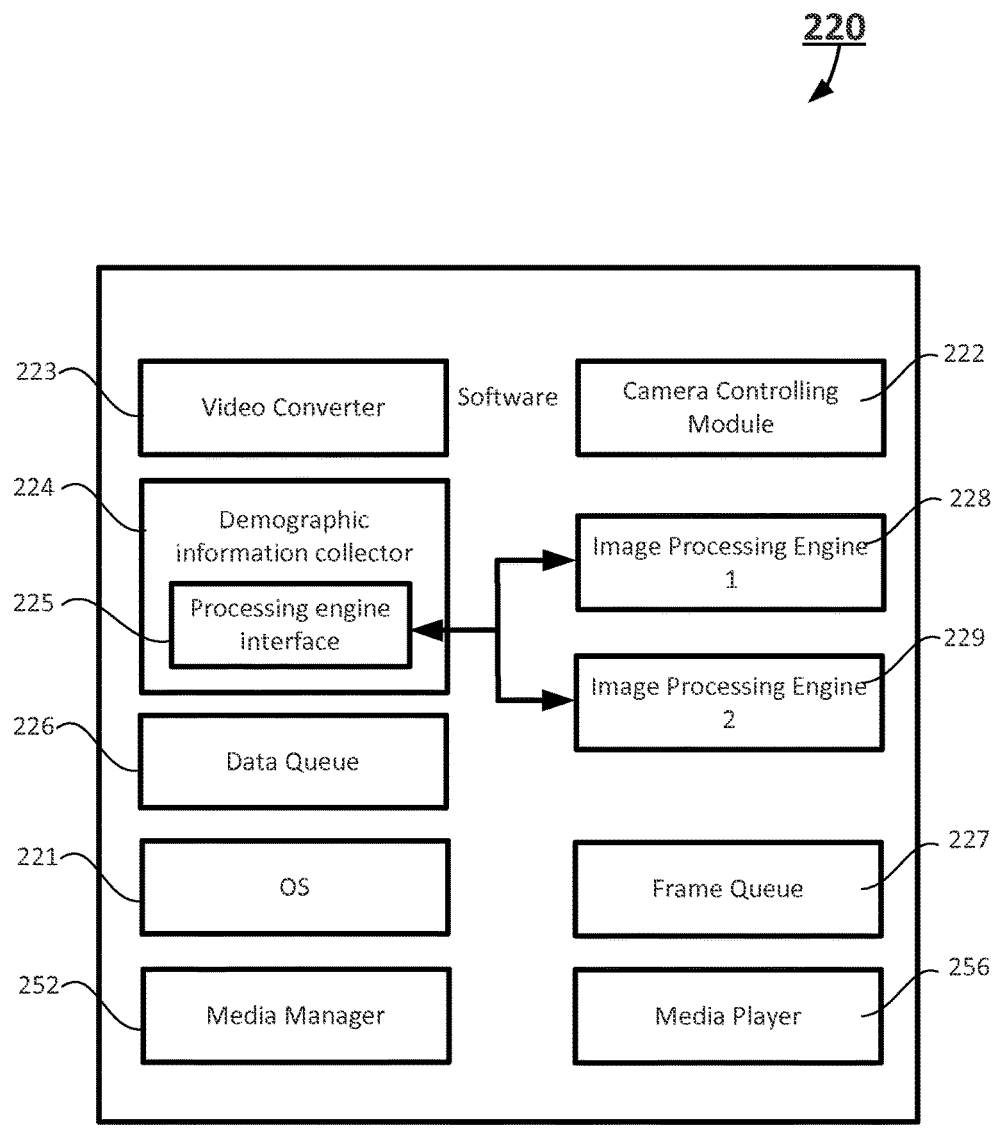
FIG. 2B schematically shows the software 220 in accordance with certain embodiments of the present disclosure.

FIG. 2A schematically shows a digital signage device 160 in accordance with certain embodiments of the present disclosure, and FIG. 2B schematically shows the software 220 in accordance with certain embodiments of the present disclosure. The digital signage device 160 can display digital media content data to the viewers. In certain embodiment, for displaying purposes, the digital signage device 160 is positioned at an area where the viewers may see the media files displayed on the digital signage device 160 without obstruction. In certain embodiment, the digital signage device 160 includes a signage device controller 204 and a display device 208.

The controller is configured to receive the program list from the DSCS 120 and then accordingly request and download the media files specified in the program list from the storage server 150. The controller displays the downloaded media files on the display device 208 according to the program list. In certain embodiments, the controller periodically requests the program list from the DSCS 120.

In certain embodiments, one or more camera 240s are associated with one or more of the signage devices 160. The camera 240 is an image capturing device for capturing images of the people passing by or viewing the digital signage device 160. From now on those people are collectively referred to as the viewers unless otherwise noted. In certain embodiments, the images captured by the camera 240 are in the format of analog video, which includes one or more frames. In certain embodiments, the camera 240 can directly generate digital image frames. To capture the image of the viewers of the digital signage device 160, the camera 240 is positioned to capture images of an area where the viewers of the digital signage device 160 are generally expected. The camera 240 can be connected to a USB connector of the signage device controller 204 and, therefore, transmit the images either in digital format or in analog format to the signage device controller 204.

The signage device controller 204 is a controlling device to control a signage device 160. The signage device controller 204 includes a processor 212 for executing instructions, a volatile memory 214, a network interface controller 216, and a non-volatile memory 218. The signage device controller 204 may be a regular computer, a special purpose computer, or a specialized microcontroller capable of being installed in a computer, such as a service processor (SP) or a baseboard management controller (BMC).

The processor 212 controls operation and executing instructions of the signage device controller 204. The volatile memory 214 is a temporary memory storing information in operation, such as the instructions executed by the processor 212. For example, the volatile memory 214 may be a random-access memory (RAM). In certain embodiments, the volatile memory 214 is in communication to the processor 212 through appropriate buses or interfaces. In certain embodiments, the signage device controller 204 may include more than one processor 212 or more than one volatile memory 214.

The network interface controller 216 is an interface for performing network communications with the network. The network interface controller 216 is in communication to the processor 212 through appropriate buses or interfaces. In certain embodiments, the signage device controller 204 may include more than one network interface controller 216 for connecting to different networks.

The non-volatile memory 218 is a persistent memory for storing data and instructions even when not powered. For example, the non-volatile memory 218 can be a flash memory or a hard drive. In certain embodiments, the non-volatile memory 218 is in communication to the processor 212 through appropriate buses or interfaces. In certain embodiments, the signage device controller 204 may include more than one non-volatile memory 218.

The non-volatile memory 218 stores software 220. The software 220 is configured, when executed, to control the camera 240 to capture the image, and to interact with an image processing module by sending the captured image to the image processing module and receiving demographic-map data corresponding to the captured image from the image processing module. Details regarding the demographic-map data will be described below.

The software 220 of the signage device controller 204 includes an operating system or kernel 221, a camera controlling module 222, a video converter 223, a demographic information collector 224, a data queue 226, a frame queue 227, one or more image processing engines 228, 229, a media manager module 252, and a media player 256. From now on, OS refers to either an operating system or a kernel, unless otherwise noted. In certain embodiments, the software 220 may include other components not shown in the figures.

The OS 221 can be collective management software managing the operation of the signage device controller 204. For example, the OS 221 can include a set of functional programs that control and manage operations of the devices connected to the signage device controller 204, such as the network interface controller 216, the camera 240, and other devices. The set of application programs provide certain utility software for the user to manage the signage device controller 204. For example, the software 220 may include a graphical user interface application program such that the user may change the setting of the signage device controller 204 through the graphical user interface. In certain embodiments, the operating system is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc.

In certain embodiments, signage devices 160 are equipped with a media manager module 252 for carrying out and coordinating various computer-implemented processes of the digital signage device 160.

In one embodiment, the media manager module 252 can request a program list or an update of the program list from the DSCS 120. The program list includes information of the identification of the signage device 160 as well as media content to be displayed by the media player 256 at specific time slots. For example, the program list can include one or more program entries. Each program entry can include one or more of the timeslot information, the campaign ID, the content ID, the content metadata, the file ID, and the storage links of the media file. After receiving the program list, the media manager module can download the specified media files from the storage server 150 using the storage links.

The signage device 160 comprises a media player 256 for displaying various announcements or playing back certain media content according to the program list provided by the media manager module 252. In other words, the media player plays back the specified media file at the timeslot specified in the program list.

The camera controlling module 222 is an application program for controlling the operation of the camera 240. The camera controlling module 222 can instruct the camera 240 when (e.g., through a time schedule) to capture the videos and also set the frame rate for the video (e.g., 30 frames per second). If the camera 240 generates analog video signals, those signals are initially sent to the video converter 223.

The video converter 223 is an analog to digital (A/D) converting module for converting the frames in the analog format to digital image frame data. In certain embodiments, the video converter 223 receives the analog signals of the frames, and converts the analog signals to the digital image frame data. After the A/D conversion, the video converter 223 sends the digital image frame data to the demographic information collector 224.

The frame queue 227 is a frame data store for storing the digital image frame data. The image frames received by the firmware from the digital camera or from the video converter are initially stored in the frame queue 227. As will be described below, the image processing engine can retrieve data for an image frame from the frame queue 227 and then process that frame.

The demographic information collector 224 is a module that can process an image to determine demographic information. The demographic information collector 224 provides a framework that different image processing engines can be plugged into the collector 224 depending on the needs. For example, different imaging processing engines may use different algorithms to process an image and, thus, are suitable to generate different type of demographic information or emphasize on different efficiency factors (e.g., speed vs. accuracy). In certain embodiments, the demographic information collector 224 is configured to retrieve an image frame from the frame queue 227 and send the digital image frame data to an image processing engine 228 or 229, to receive the demographic-map data from the image processing engine 228 or 229, and to send the demographic-map data to the demographic information server 134 via the network. The demographic information collector 224 initiates one of the image processing engines (for example, the image processing engine 228) for processing the digital image frame data, and sets up the configuration of the image processing engine 228. The demographic information collector 224 then calls the image processing engine 228 to process the current digital image frame data and to generate the demographic-map data. When the image processing engine 228 sends back the demographic-map data, the demographic information collector 224 stores the demographic-map data in the data queue 226, and periodically sends the demographic-map data in the data queue 226 to the demographic information server 134 via the network. In certain embodiments, the demographic information collector 224 may send instructions to the demographic information server 134 via the network to manage the demographic-map data stored in the demographic information server 134.

In certain embodiments, the demographic information collector 224 can provide the common framework for holding an image processing engine through an image-processing-engine interface 225. For example, the image-processing-engine interface 225 is an application programming interface (API). Each of the image processing engines 228, 229 implements the functions defined by the image-processing-engine interface. The demographic information collector 224 understands the image-processing-engine interface and can invoke those implemented functions of an image processing engine once the image processing engine is linked to the demographic information collector 224.

The image-processing-engine interface 225 provides a function that the demographic information collector 224 can use to configure the image processing engine implementing the image-processing-engine interface. Through that function, the demographic information collector 224 can configure what types of demographic information it should collect. For example, the demographic information collector 224 can configure the image processing engine to collect personal attributes such as gender, age, ethnicity, height, skin color, hair color, hair length, facial hair, weight, static/in motion, accessories, stroller, glasses, beard, tie, brief-case, and suitcase information of each viewer. Further, the demographic information collector 224 can also configure the image processing engine to collect data relating to a person's behavior such as the duration at the scene (i.e, how long a person has stayed at the scene) or attentiveness (i.e., whether a person is paying attention to the content displayed at the digital signage). In certain embodiments, those configurations can be set up in a configuration file, which will be read by the image processing engine.

In certain embodiments, the image-processing-engine interface provides a function that demographic information collector can use to configure a detection level for attributes of a scene. An image processing engine implementing the image-processing-engine interface can have several different detection levels. For example, it can have 7 levels as follows: 1. No Analysis; 2. Human(s)/No Human(s); 3. Count Humans; 4. Count Humans Static vs in Motion; 5. Age: kids, youth, adult, senior; 6. Gender; man vs woman; 7. Advanced; Accessories, stroller, glasses, beard, tie, brief-case, suitcase, etc.

The image processing engine often preprocesses an image frame into features. For example, the image processing engine 228, 229 can run an edge detector on the image frame, and then collect features such as edge direction, edge strength, and offset from a segment center for each segment. Thus, an image frame can be reduced to a collection of features. Based on some of those features, the image processing engine 228, 229 can detect persons in an image frame. Based on some of other features, the image processing engine can further determine the above listed personal attributes of a detected person.

The image-processing-engine interface can provide a function that demographic information collector can use to configure what features should be collected during preprocessing. The image-processing-engine interface can provide a function that demographic information collector can use to configure what features should be used to determine a personal attribute and the weight (or importance) factors of some or all the features should be applied during the determination process.

In certain embodiments, the image-processing-engine interface can provide a function that demographic information collector can use to define a category with the image processing engine and to instruct the image processing engine 228, 229 to determine the number of people in that category presented in the image frame currently being processed. For example, demographic information collector can define four age categories: category age 21-30, category age 31-40, category age 41-50, and category age other. The image processing engine accordingly determines the number of people in each of the categories presented in the image frame currently being processed.

The image-processing-engine interface defines a function that demographic information collector can call to pass on an image frame and then in response receive demographic-map data returned from an implementing image processing engine.

The demographic-map data includes viewer data recognized from the frames of the image. In certain embodiments, the demographic-map data includes at what time (time information) and at what location (location information) the frame was generated, and viewer information related to the persons appearing in the image. The viewer information can include scene- and personal-attribute data and personal behavior data generated. In general, the scene- and personal-attribute data can be generated by processing a single image, while the personal-behavior data can be generated by processing more than one frame. For example, the personal attribute data can relate to appearance and body features, and the personal behavior data can relate to viewers' actions observed in a period of time. Examples of the personal attribute data include gender, age, ethnicity, height, skin color, hair color, hair length, facial hair and weight. Examples of the personal behavior data include duration and attentiveness.

The data queue 226 is a data store that is used by demographic information collector to temporarily store the demographic-map data. When the image processing engine 228 sends back the demographic-map data, the demographic information collector 224 stores the demographic-map data in the data queue 226. The demographic information collector 224 can periodically remove demographic-map data in the data queue 226 and send those data to the demographic information server 134 via the network. In certain embodiments, the demographic information collector 224 periodically checks if the data queue 226 is full. When the data queue 226 is full, the demographic information collector 224 remove the demographic-map data in the data queue 226 and sends the data to the demographic information server 134 via the network.

As discussed above, the demographic information collector 224 can use an image processing engine 228 or 229 that implements the functions of the image-processing-engine interface.

Once receiving an image frame from the demographic information collector 224, the image processing engine 228 or 229 can preprocess the image frame to obtain default features (such as corner, line, edge, and center-surrounded features) or features as configured by the demographic information collector 224.

The image processing engine can use various techniques to process those features in order to detect persons in the image frame as well as the personal attributes of each person. For example, based on the needs, the image processing engine can use one or more of a naïve/normal classifier, binary decision trees, boosting techniques, random trees, a Haar classifier, and a Viola-Jones classifier. The image processing engine can adjust the weight/importance factors of some or all of the features and according to which the features are evaluated by the image processing engine to detect different attributes.

Thus, after processing each of the image frame received, the image processing engine can detect how many people appear in the image frame and the personal attributes of each of the people. Based on a default detection level or the detection level configured by demographic information collector, the detected personal attributes can include one or more of gender, age, ethnicity, height, skin color, hair color, hair length, facial hair, weight, static/in motion, accessories, stroller, glasses, beard, tie, brief-case, and suitcase information.

Further, in certain embodiments, the image processing engine may group one or more persons in a default category or a category configured by demographic information collector. For example, the image processing engine can examine the personal attributes of each person and determine which category that person should be assigned to. Thus, the image processing engine 228, 229 can determine the number of people in each category. The image processing engine can also use other techniques such as a k-means cluster.

In certain embodiments, the image processing engine can temporarily save each received image frame to a queue. In addition to processing the currently received image frame to generate demographic information as discussed above, the image processing engine can process the current image frame as well as several previously received image frames (now saved in the queue) together or with reference to the previously received image frames. Those image frames may or may not be consecutive image frames. By using features generated from several frames at different times, the image processing engine can trace a person's movement as well as the duration of a person at the scene. In other words, the image processing engine can determine whether the same person appeared in several different frames captured at different times. Further, by detecting whether a person is facing the digital signage and how long the person was facing the digital signage, the image processing engine 228, 229 can determine the attentiveness of that person. On the other hand, if a person was facing random directions in the consecutive frames, she or he likely did not pay much attention to the information on the digital signage display.

Then, the image processing engine can use those detected information to construct a demographic-map data object. For example, the demographic-map data object can be a JSON object. In this example, the demographic-map data object can include a timestamp indicating to what time the demographic-map data is directed to, a location code indicating to what location the demographic-map data is directed to, the number of people detected, and the personal attributes of each detected person. Further, the demographic-map data object can also include how long each person has been at the scene and the attentiveness of each person.

The demographic information server 134 receives the demographic-map data objects from one or more signage devices 160. In certain embodiments, the media content management cloud system 102 may include more than one demographic information server 134.

After the demographic information server 134 receives a demographic-map data object, the demographic information server 134 stores the demographic information about time and location specified in the data object in a data store. By storing demographic-map data objects continuously received from multiple signage devices 160 at different locations, the demographic information server eventually stores the demographic information at different locations and times. Further, the demographic information server 134 can process those data to identify any demographic patterns and trends. Based on those patterns and trends, the demographic information server 134 can further predict times and locations at which certain demographic groups (e.g., male viewers between age 30-40) will be present.

Figure 3A:
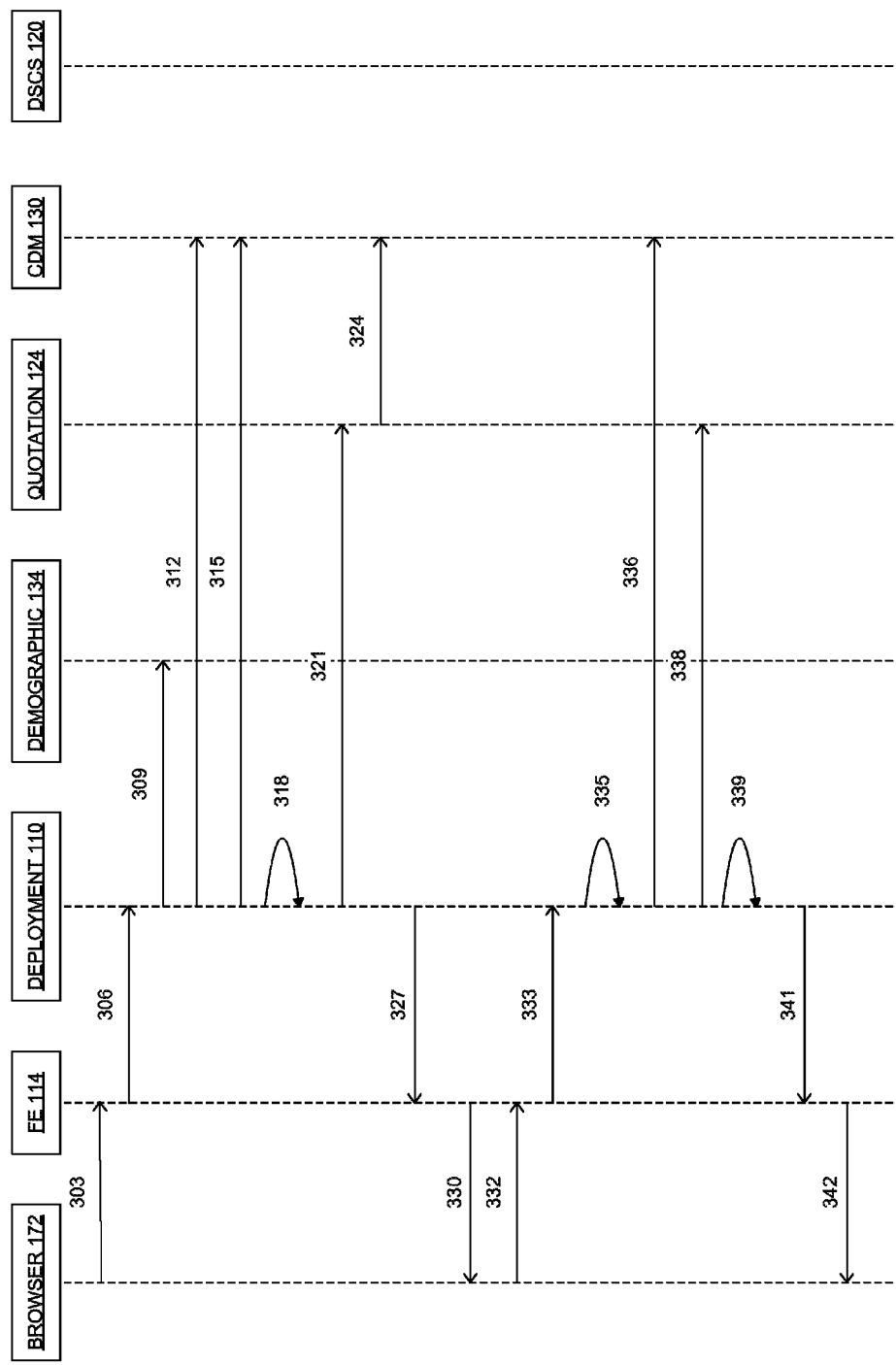
FIGS. 3A, 3B and 3C schematically illustrate a management process of a media content management and deployment system in accordance with certain embodiments of the present disclosure.
Figure 3B:
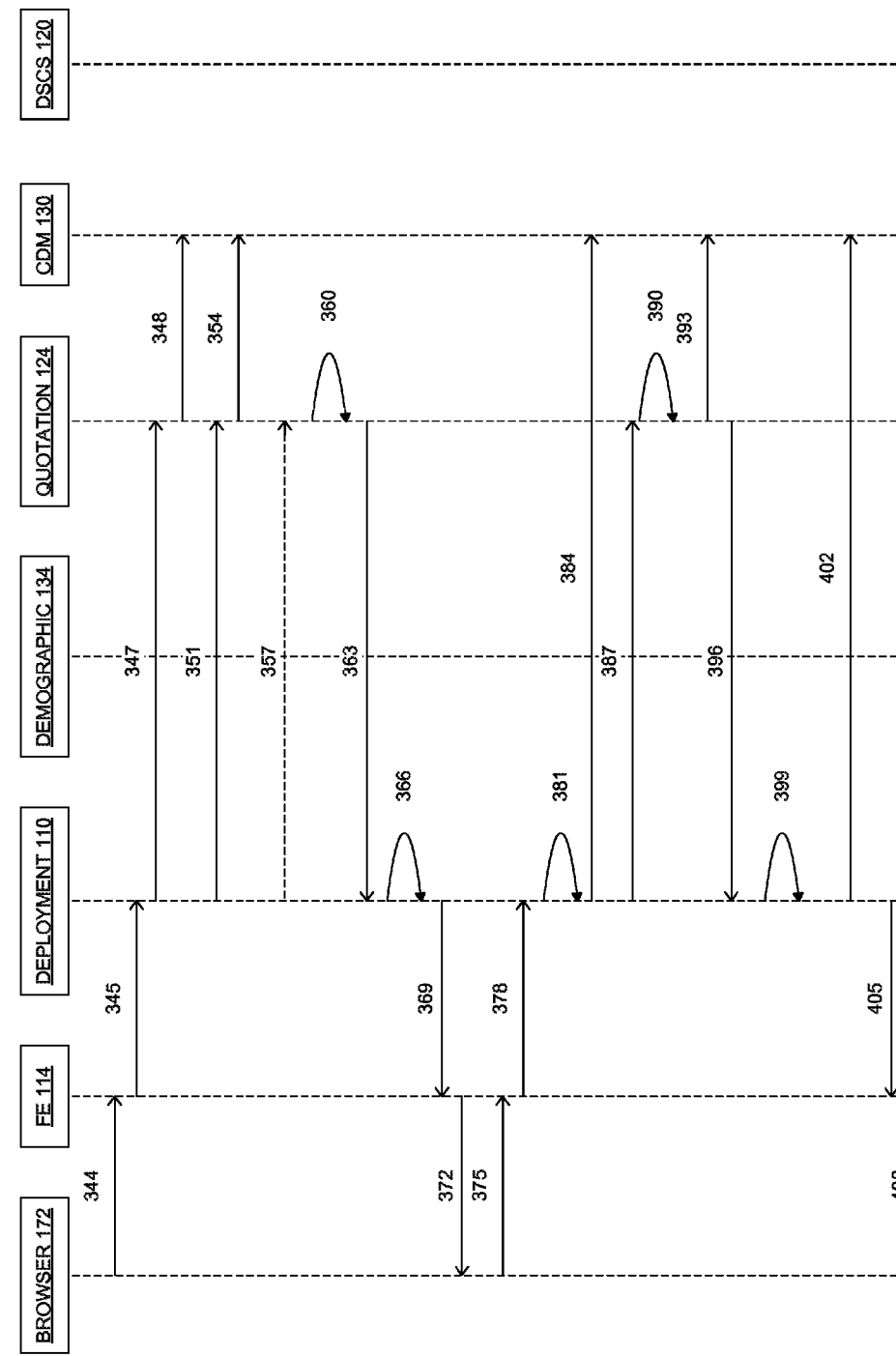
Figure 3C:
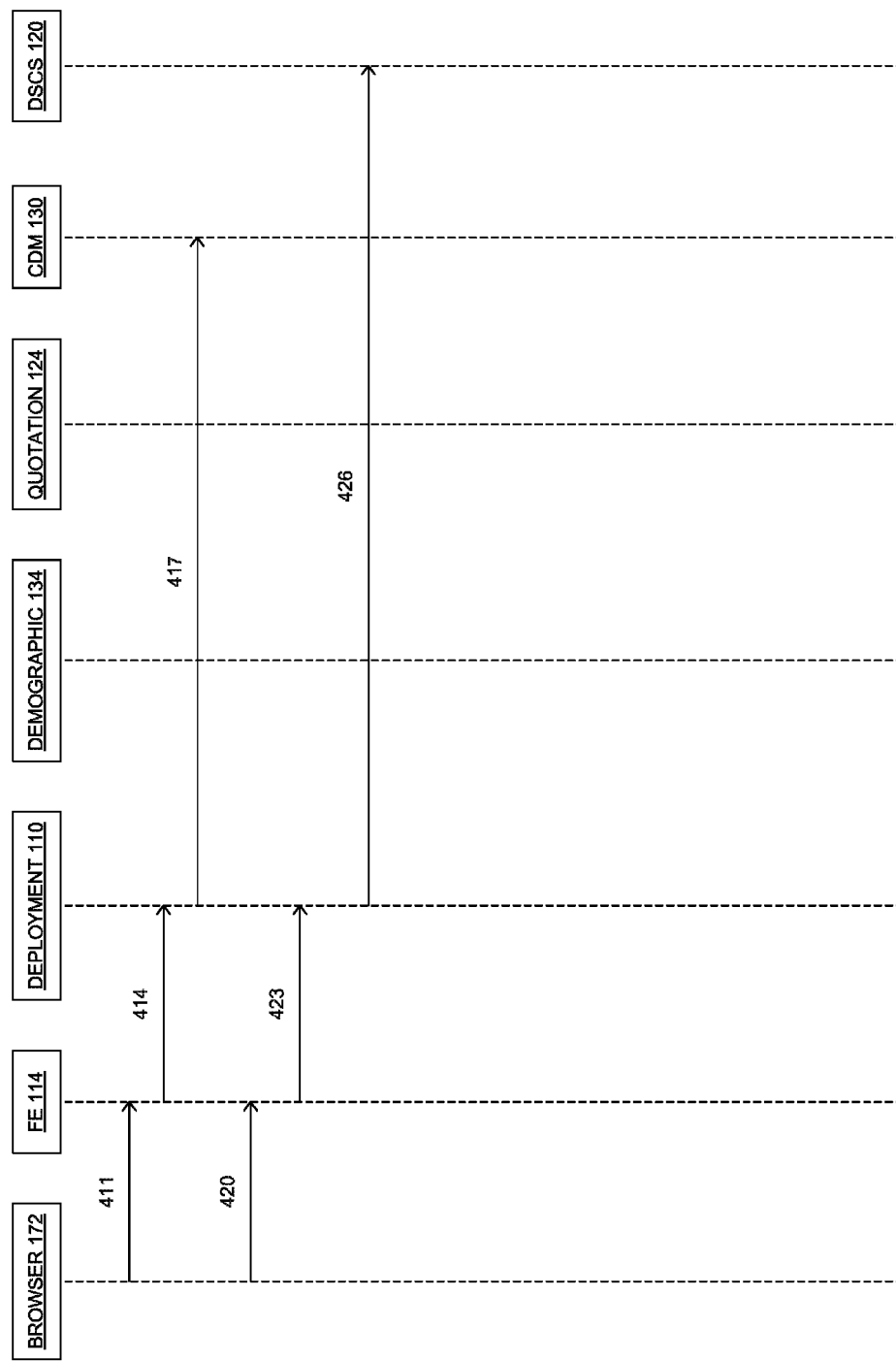

FIGS. 3A, 3B and 3C schematically illustrate a management process of a media content management and deployment system 100 in accordance with certain embodiments of the present disclosure. Referring to FIG. 3A, at operation 303, the user 170 through the web browser 172 sends campaign parameters for a particular campaign through one or more data objects such as JSON, XML, CSV to the front end server 114. At operation 306, the front end server 114 sends the campaign parameters to the media deployment module 110. At operation 309, the media deployment module 110 obtains the demographic parameters from the campaign parameters. The media deployment module 110 then queries the demographic information server 134 for candidate signage devices 160 and timeslots that satisfy the demographic requirements specified by the demographic parameters. Upon receiving the candidate signage device information, at operation 312, the media deployment module 110 queries the central data module 130 to retrieve signage device information of the candidate signage device 160. Upon receiving the candidate timeslots information, at operation 315, the media deployment module 110 queries the central data module 130 to determine whether the candidate timeslots are for sale or for bidding. Subsequently, at operation 318, the media deployment module 110 determines the available candidate timeslots and signage devices 160. At operation 321, the media deployment module 110 queries the quotation calculator 124 for price information (e.g., sale price or bid price) of each of the available candidate timeslots. At operation 324, the quotation calculator 124 queries the sale timeslot data collection of the central data module 130 to get the sale price information. The quotation calculator 124 queries the bid timeslot data collection to get the bid price information. At operation 327, the media deployment module 110 obtains information of the available candidate timeslots and signage devices 160 and sends the information to the front end server 114 through one or more data objects. At operation 330, the front end server 114 accordingly sends the information to the web browser 172 for displaying to the user 170.

At operation 332, the user 170 clicks a button displayed on the web browser 172 to claim and place bids on all of the available candidate timeslots and candidate signage devices 160 through the web browser 172, which accordingly sends the user 170's selections to the front end server 114. At operation 333, the front end server 114 sends the claim-all instruction to the media deployment module 110. At operation 335, the media deployment module 110, based on the user selection information, generates a proposed campaign deployment plan that includes all of the available candidate timeslots. At operation 336, the media deployment module 110 stores the proposed campaign deployment plan to the campaign deployment plan data collection of the central data module 130.

At operation 338, the media deployment module 110 queries the quotation calculator 124 for the sale price or bid price of each of the available candidate timeslots. At operation 339, the media deployment module 110 determines the total cost to claim and place bids on both the available candidate timeslots. At operation 341, the media deployment module 110 sends the total cost information to the front end server 114, which accordingly sends the information to the web browser to seek approval from the user 170 at operation 342.

Referring to FIG. 3B, at operation 344, the user 170 sends his or her approval through web browser 172 to the front end server 114, which accordingly sends the approval to the media deployment module 110 at operation 345.

At operation 347, the media deployment module 110, based on the user selection information, requests the quotation calculator 124 to claim one or more timeslots for sale. At operation 348, the quotation calculator 124 revises the sale timeslot data collection and the claimed timeslot data collection of the central data module 130 accordingly to indicate that the user 170 has claimed the selected one or more timeslots for sale.

At operation 351, the media deployment module 110, based on the user selection information, requests the quotation calculator 124 to place bids on one or more timeslots for bidding. At operation 354, the quotation calculator 124 writes the bid prices for the one or more selected timeslots for bidding to the bid timeslot data collection. Subsequently, at operation 357, a different user 170 may request the quotation calculator 124 to place a higher bid for the same timeslot. At operation 360, the quotation calculator 124 determines that the initial user 170 has been outbid. Therefore, at operation 363, the quotation calculator 124 sends an outbid notification to the media deployment module 110 to indicate that the initial user 170 has been outbid.

After receiving the outbid notification, the media deployment module 110, at operation 366, determines the campaign that is affected. In certain embodiments, the media deployment module 110 can automatically adjust the proposed campaign deployment plan of the affected campaign. For example, the media deployment module 110 can place bid on or claim a different timeslot. In certain circumstances, the media deployment module 110 can determine that the current budget is not sufficient to place another bid on the outbid timeslot. Therefore, at operation 369, the media deployment module 110 can send a request to increase budget to the front end server 114. Accordingly, at operation 372, the front end server 114 sends the request to the web browser 172 for the user 170's approval.

At operation 375, the web browser 172 transmits the user input to the front end server 114, which accordingly transmits the input to the quotation calculator 124 at operation 378. At operation 381, based on the input, the media deployment module 110 can revise the proposed campaign deployment plan. At operation 384, the media deployment module 110 stores the revised campaign deployment plan to the central data module 130. Accordingly, at operation 387, the media deployment module 110 can request the quotation calculator 124 to claim or place a bid on the timeslots as specified in the revised campaign deployment plan.

At operation 390, the quotation calculator 124 periodically scans the bid timeslot data collection to determine whether the bidding process for any timeslot has completed. Once the bidding process has completed, at operation 393, the quotation calculator 124 accordingly updates the bid timeslot data collection and claimed timeslot data collection in the central data module 130. At operation 396, the quotation calculator 124 notifies the media deployment module 110 of the bidding result of the particular timeslot. At operation 399, the media deployment module 110 determines whether of the timeslots specified in the proposed campaign deployment plan have been claimed for the particular campaign. If that is the case, the media deployment module 110 prepares an updated campaign deployment plan for the particular campaign and stores the finalized plan to the campaign deployment plan data collection of the central data module 130.

At operation 402, the media deployment module 110 requests media content items available to the user 170. At operation 405, the media deployment module 110 sends the final timeslot information and available content item information to the front end server 114, which accordingly sends the information to the web browser 172 for displaying to the user 170 at operation 408.

Referring to FIG. 3C, at operation 411, the user through the web browser 172 assigns the available media items/files to different timeslots of the campaign. The information is transmitted from the web browser 172 to the front end server 114. At operation 414, the front end server 114 accordingly sends the information to the media deployment module 110. At operation 417, the media deployment module 110 writes the media file assignment information to the campaign deployment plan stored in the central data module 130. In other words, each claimed timeslot in the campaign deployment plan now has been assigned a media file. The media deployment module 110 accordingly prepares a final campaign deployment plan.

At operation 420, the user 170 through the web browser sends a deployment instruction for the particular campaign to the front end server 114, which accordingly transmits the instruction to the media deployment module 110 at operation 423. At operation 426, the media deployment module 110 sends a deployment instruction for the particular campaign to the DSCS 120.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A media content management and deployment system, comprising:
- a plurality of signage devices, each including a camera that captures images of people passing by and a plurality of processing engines that are different, each of the plurality of processing engines being configured to
  - implement a same common interface through which a component of the each signage device accesses that processing engine, wherein the common interface includes a function through which a detection level of that processing engine is set,
  - digitally process the captured images, when requested, to generate demographic data associated with the captured images,
  - detect, in each of the captured images, at least one of an edge direction, an edge strength, and offset from a segment center for each segment to determine a person in the each image and personal attributes of the person, and
  - detect image attributes of a first image of the captured images in accordance with the detection level set for that processing engine, wherein that processing engine supports at least six detection levels, each of the six detection levels indicating a respective one of collections of image attributes that is to be detected by that processing engine:
    - (a) a collection including an image attribute indicating whether the first image contains a human,
    - (b) a collection including all preceding attributes and an image attribute indicating a number of humans contained in the first image,
    - (c) a collection including all preceding attributes and image attributes indicating a number of humans contained in the first image who are static and a number of humans contained in the first image who are in motion,
    - (d) a collection including all preceding attributes and image attributes indicating age categories of the humans contained in the first image,
    - (e) a collection including all preceding attributes and image attributes indicating genders of the humans contained in the first image, and
    - (f) a collection including all preceding attributes and image attributes indicating whether the humans contained in the first image are associated with accessories, a stroller, glasses, a beard, a tie, a brief-case, or a suitcase; and
- a media content management cloud system in communication with the plurality of signage devices, the media content management cloud system comprising:
  - a data store having a processor and a memory, wherein the data store is configured to
    - store, in a timeslot data collection, available timeslot information data specifying available timeslots of the plurality of signage devices,
    - store, in a geographic data collection, signage device information data specifying a location of each of the plurality of signage devices; and
    - store, in a content item data collection, content items each specify descriptive information of a respective media content object, the descriptive information including a storage link indicating a storage location of the respective media content object in a media store;
  - the media store having a processor and a memory, configured to store media content objects each retrievable by a storage link;
  - a demographic information server that receives the generated demographic data from the plurality of signage devices;
  - a front end server configured to
    - send a user input interface to a remote computing device, wherein the user input interface is configured to
      - allow a user to input first campaign parameters for building a first campaign, the first campaign parameters including target demographic parameters, wherein the first campaign defines a plurality of media content items and claims a group of the signage devices and a plurality of timeslots on the claimed group of the signage devices such that the plurality of media content items are displayed at the claimed timeslots on the claimed group of the signage devices,
      - obtain and display candidate timeslots of candidate signage devices for displaying the plurality of media content items, and
      - allow the user to input an instruction to claim all of the candidate timeslots of the candidate signage devices for the first campaign;
  - a deployment module configured to
    - obtain the first campaign parameters from the user input interface executed at the remote computing device, query the demographic information server to obtain location parameters and time parameters that define locations and time periods at which a target demographic presents, respectively, based on the target demographic parameters;

examine the signage device information data stored in the data store and the location parameters of the first campaign parameters to select the candidate signage devices from the plurality of signage devices, examine the available timeslot information data stored in the data store and the time parameters of the first campaign parameters to select the candidate timeslots of the candidate signage devices from the available timeslots, determine a first subset of the candidate timeslots at one or more of the candidate signage devices, each timeslot of the first subset being designated for sale at a respective predetermined sale price, determine a second subset of the candidate timeslots at one or more of the candidate signage devices, each timeslot of the second subset being designated for bidding, receive a request to claim all of the first subset and the second subset of the candidate timeslots of the candidate signage devices for the first campaign, generate first campaign deployment plan data of the first campaign, the first campaign deployment plan data including data specifying the claimed first subset and the second subset of the candidate timeslots at the one or more candidate signage devices, send the first campaign deployment plan data to the data store, the data store storing the first campaign deployment plan data as a data object to allocate all of the first subset and the second subset of the candidate timeslots at the one or more of the candidate signage devices to the first campaign, the central data module determining that all of the first subset and the second subset of the candidate timeslots at the one or more of the candidate signage devices are allocated to the first campaign based on the data object, examine the content item data collection to determine one or more content items that are available to the user, and obtain a subset of content items, including the plurality of media content items, of the one or more content items that are available to the user for use at the first subset and the second subset of the candidate timeslots at the one or more of the candidate signage devices, wherein the first campaign deployment plan data further specifies the subset of content items;

a digital signage control service (DSCS) configured to
obtain the first campaign deployment plan data from the data store,
generate a program list of the plurality of media content items based on the first campaign deployment plan data, and
send the program list to the candidate signage devices such that the plurality of media content items are displayed on the candidate signage devices at the claimed candidate timeslots based on the program list, wherein the program list indicates storage links of the plurality of media content items.

2. The system of claim 1, wherein the available timeslot information data include sale timeslot information data specifying available timeslots of the plurality of signage devices and each for sale at a predetermined respective sale price;
wherein the system further comprises a quotation calculator configured to obtain from the data store the sale price of a given timeslot for sale;
wherein the deployment module is configured to
obtain from the quotation calculator a sale price for each timeslot in the first subset, and
calculate a total price including a cost for claiming all the timeslots in the first subset;
wherein the front end server is configured to
obtain from the deployment module price data specifying the total price, and send the price data to the user input interface, and
instruct the user input interface to display an input option that allows the user to accept the total price for claiming all of the candidate timeslots of the candidate signage devices.

3. The system of claim 2, wherein the data store is configured to store claimed timeslot information data specifying timeslots of the plurality of signage devices that are claimed by a campaign;
wherein the deployment module is configured to
request the quotation calculator to claim a first timeslot in the first subset for the first campaign, and
update the first campaign deployment plan data to include the first timeslot;
wherein the quotation calculator is configured to
receive a request to claim the first timeslot for the first campaign,
instruct the data store to update the claimed timeslot information data to specify that the first timeslot is claimed by the first campaign, and
instruct the data store to update the sale timeslot information data to remove the first timeslot.

4. The system of claim 2, wherein the available timeslot information data include bid timeslot information data specifying available timeslots of the plurality of signage devices and each for bidding at a respective bid price;
wherein the quotation calculator is configured to obtain from the data store the bid price of a given timeslot for bidding;
wherein the deployment module is configured to
obtain from the quotation calculator a bid price for each timeslot in the second subset, and
calculate the total price including a cost for placing bids on all the timeslots in the second subset;
wherein the front end server is configured to instruct the user input interface to display an input option that allows the user to accept the total price for claiming and placing bids on all of the candidate timeslots of the candidate signage devices.

5. The system of claim 4, wherein the deployment module is configured to request the quotation calculator to place a bid on a second timeslot of the second subset for the first campaign;
wherein the quotation calculator is configured to
receive a request to place the bid on the second timeslot for the first campaign, and
instruct the data store to update the bid timeslot information data to specify that a bid for the first campaign is placed on the second timeslot.

6. The system of claim 5, wherein the quotation calculator is configured to receive a request to place a bid on the second timeslot for a second campaign, and instruct the data store to update the bid timeslot information data to specify that a bid for the second campaign is placed on the second timeslot.

7. The system of claim 6, wherein the data store is configured to store claimed timeslot information data specifying timeslots of the plurality of signage devices that are claimed by a campaign;

wherein the bid timeslot information data specify a bid period for each of the timeslots for bidding;

wherein the quotation calculator is configured to examine the bid timeslot information data to determine whether the bid period for the second timeslot has expired, in response to determining that the bid period for the second timeslot has expired, instruct the data store to update the claimed timeslot information data to specify that the second timeslot is claimed by a winning campaign which placed a highest bid on the second timeslot, instruct the data store to update the bid timeslot information data to remove the second timeslot, and send to the deployment module data specifying the winning campaign and the second timeslot; and wherein the deployment module is configured to update a campaign deployment plan data of the winning campaign to include the second timeslot.

8. The system of claim 6, wherein the quotation calculator is configured to send a notification to the deployment module, the notification specifying that the second campaign has placed a bid on the second timeslot higher than the bid placed on the second timeslot by the first campaign, and wherein the deployment module is configured to, in response to the notification, request the quotation calculator to place another bid on the second timeslot for the first campaign, the another bid being higher than the bid placed by the second campaign.

9. The system of claim 2, wherein the deployment module is configured to request the quotation calculator to claim each timeslot of the first subset for the first campaign, and request the quotation calculator to place a bid on each timeslot of the second subset for the first campaign.

10. The system of claim 1, wherein the deployment module is configured to determine whether all the candidate timeslots have been successfully claimed for the first campaign.

11. A method of managing and deploying media content, comprising:

storing, in a timeslot data collection of a data store of a media content management cloud system, available timeslot information data specifying available timeslots of a plurality of signage devices, wherein the media content management cloud system is in communication with the plurality of signage devices, wherein each of the plurality of signage devices includes a camera that captures images of people passing by and a plurality of processing engines that are different, each of the plurality of processing engines being configured to implement a same common interface through which a component of the each signage device accesses that processing engine, wherein the common interface includes a function through which a detection level of that processing engine is set, digitally process the captured images, when requested, to generate demographic data associated with the captured images, detect, in each of the captured images, at least one of an edge direction, an edge strength, and offset from a segment center for each segment to determine a person in the each image and personal attributes of the person, and detect image attributes of a first image of the captured images in accordance with the detection level set for that processing engine, wherein that processing engine supports at least six detection levels, each of the six detection levels indicating a respective one of collections of image attributes that is to be detected by that processing engine:

(a) a collection including an image attribute indicating whether the first image contains a human, (b) a collection including all preceding attributes and an image attribute indicating a number of humans contained in the first image, (c) a collection including all preceding attributes and image attributes indicating a number of humans contained in the first image who are static and a number of humans contained in the first image who are in motion, (d) a collection including all preceding attributes and image attributes indicating age categories of the humans contained in the first image;

(e) a collection including all preceding attributes and image attributes indicating genders of the humans contained in the first image; and (f) a collection including all preceding attributes and image attributes indicating whether the humans contained in the first image are associated with accessories, a stroller, glasses, a beard, a tie, a brief-case, or a suitcase; and storing, in a geographic data collection of the data store, signage device information data specifying a location of each of the plurality of signage devices;

storing, in a content item data collection, content items each specify descriptive information of a respective media content object, the descriptive information including a storage link indicating a storage location of the respective media content object in a media store;

storing, in the media store, media content objects each retrievable by a storage link;

receiving, at a demographic information server, the generated demographic data from the plurality of signage devices;

sending, from a front end server of the media content management cloud system, a user input interface to a remote computing device, wherein the user input interface is configured to receive first campaign parameters from a user for building a first campaign, wherein the first campaign parameters comprise target demographic parameters, and wherein the first campaign defines a plurality of media content items and claims a group of the signage devices and a plurality of timeslots on the claimed group of the signage devices such that the plurality of media content items are displayed at the claimed timeslots on the claimed group of the signage devices, obtain and display candidate timeslots of candidate signage devices for displaying media content, and receive an instruction from the user to claim all of the candidate timeslots of the candidate signage devices for the first campaign;

receiving, at a deployment module of the media content management cloud system, the first campaign parameters from the user input interface executed at the remote computing device;

querying, at a deployment module, the demographic information server to obtain location parameters and time parameters that define locations and time periods at which a target demographic presents, respectively, based on the target demographic parameters;

examining, at the deployment module, the signage device information data stored in the data store and the location parameters of the first campaign parameters to select the candidate signage devices from the plurality of signage devices;

examining, at the deployment module, the available timeslot information data stored in the data store and the time parameters of the first campaign parameters to select the candidate timeslots of the candidate signage devices from the available timeslots;

determining a first subset of the candidate timeslots at one or more of the candidate signage devices, each timeslot of the first subset being designated for sale at a respective predetermined sale price, determining a second subset of the candidate timeslots at one or more of the candidate signage devices, each timeslot of the second subset being designated for bidding, receiving, at the deployment module, a request to claim all of the first subset and the second subset of the candidate timeslots at the one or more candidate signage devices from the user input interface executed at the remote computing device, generating, at the deployment module, first campaign deployment plan data of the first campaign, the first campaign deployment plan data including data specifying the claimed candidate timeslots and the candidate signage devices, sending, by the deployment module, the first campaign deployment plan data to the data store of the media content management cloud system, the data store storing the first campaign deployment plan data as a data object to allocate all of the first subset and the second subset of the candidate timeslots at the one or more of the candidate signage devices to the first campaign, the central data module determining that all of the first subset and the second subset of the candidate timeslots at the one or more of the candidate signage devices are allocated to the first campaign based on the data object, examining, by the deployment module, the content item data collection to determine one or more content items that are available to the user, obtaining, by the deployment module, a subset of content items, including the plurality of media content items, of the one or more content items that are available to the user for use at the first subset and the second subset of the candidate timeslots at the one or more of the candidate signage devices, wherein the first campaign deployment plan data further specifies the subset of content items, obtaining, by a digital signage control service (DSCS) of the media content management cloud system, the first campaign deployment plan data from the data store, generating, by the DSCS, a program list of the plurality of media content items based on the first campaign deployment plan data, and sending, by the DSCS, the program list to the candidate signage devices such that the plurality of media content items are displayed on the candidate signage devices at the claimed candidate timeslots based on the program list, wherein the program list indicates storage links of the plurality of media content items.

12. The method of claim 11, wherein the available timeslot information data comprises sale timeslot information data specifying available timeslots of the plurality of signage devices and each for sale at a predetermined respective sale price, wherein the method further comprises:

obtaining, at a quotation calculator, a sale price of a given timeslot for sale from the data store;

obtaining, at the deployment module, the sale price for each timeslot in the first subset from the quotation calculator;

calculating, at the deployment module, a total price including a cost for claiming all the timeslots in the first subset;

obtaining, at the front end server, price data specifying the total price from the deployment module, and sending the price data to the user input interface, and instructing, by the front end server, the user input interface to display an input option that allows the user to accept the total price for claiming all of the candidate timeslots of the candidate signage devices.

13. The method of claim 12, further comprising:

storing, at the data store, claimed timeslot information data specifying timeslots of the plurality of signage devices that are claimed by a campaign;

requesting, by the deployment module, the quotation calculator to claim a first timeslot in the first subset for the first campaign, wherein the quotation calculator is configured to receive a request to claim the first timeslot for the first campaign, instruct the data store to update the claimed timeslot information data to specify that the first timeslot is claimed by the first campaign, and instruct the data store to update the sale timeslot information data to remove the first timeslot;

updating, at the deployment module, the first campaign deployment plan data to include the first timeslot;

requesting, by the deployment module, the quotation calculator to claim each timeslot of the first subset for the first campaign, and requesting, by the deployment module, the quotation calculator to place a bid on each timeslot of the second subset for the first campaign.

14. The method of claim 12, wherein the available timeslot information data include bid timeslot information data specifying available timeslots of the plurality of signage devices and each for bidding at a respective bid price, wherein the method further comprises:

obtaining, at the quotation calculator, the bid price of a given timeslot for bidding from the data store;

obtaining, at the deployment module, a bid price for each timeslot in the second subset from the quotation calculator;

calculating, at the deployment module, the total price including a cost for placing bids on all the timeslots in the second subset; and instructing, by the front end server, the user input interface to display an input option that allows the user to accept the total price for claiming and placing bids on all of the candidate timeslots of the candidate signage devices.

15. The method of claim 14, further comprising:
requesting, by the deployment module, the quotation calculator to place a bid on a second timeslot of the second subset for the first campaign;
receiving, at the quotation calculator, a request to place the bid on the second timeslot for the first campaign and to place a bid on the second timeslot for a second campaign; and
instructing, by the quotation calculator, the data store to update the bid timeslot information data to specify that a bid for the first campaign and a bid for the second campaign are placed on the second timeslot.

16. The method of claim 15, further comprising:
storing, at the data store, claimed timeslot information data specifying timeslots of the plurality of signage devices that are claimed by a campaign, wherein the bid timeslot information data specify a bid period for each of the timeslots for bidding;
examining, at the quotation calculator, the bid timeslot information data to determine whether the bid period for the second timeslot has expired;
in response to determining that the bid period for the second timeslot has expired, instructing, by the quotation calculator, the data store to update the claimed timeslot information data to specify that the second timeslot is claimed by a winning campaign which placed a highest bid on the second timeslot;
instructing, by the quotation calculator, the data store to update the bid timeslot information data to remove the second timeslot;
sending, by the quotation calculator, data specifying the winning campaign and the second timeslot to the deployment module; and
updating, at the deployment module, a campaign deployment plan data of the winning campaign to include the second timeslot.

17. The method of claim 15, further comprising:
sending, by the quotation calculator, a notification to the deployment module, the notification specifying that the second campaign has placed a bid on the second timeslot higher than the bid placed on the second timeslot by the first campaign, and
in response to the notification, requesting, by the deployment module, the quotation calculator to place another bid on the second timeslot for the first campaign, the another bid being higher than the bid placed by the second campaign.

18. The method of claim 11, further comprising:
determining, at the deployment module, whether all the candidate timeslots have been successfully claimed for the first campaign.

19. A non-transitory computer readable medium storing computer executable codes executable at one or more processors of a media content management cloud system, wherein the codes comprise:
a data store, when executed at the processor, configured to store, in a timeslot data collection, available timeslot information data specifying available timeslots of a plurality of signage devices, wherein the media content management cloud system is in communication with the plurality of signage devices, wherein each of the plurality of signage devices includes a camera that captures images of people passing by and a plurality of processing engines that are different, each of the plurality of processing engines being configured to
implement a same common interface through which a component of the each signage device accesses that processing engine, wherein the common interface includes a function through which a detection level of that processing engine is set,
digitally process the captured images, when requested, to generate demographic data associated with the captured images, and
detect, in each of the captured images, at least one of an edge direction, an edge strength, and offset from a segment center for each segment to determine a person in the each image and personal attributes of the person,
detect image attributes of a first image of the captured images in accordance with the detection level set for that processing engine, wherein that processing engine supports at least six detection levels, each of the six detection levels indicating a respective one of collections of image attributes that is to be detected by that processing engine:
(a) a collection including an image attribute indicating whether the first image contains a human,
(b) a collection including all preceding attributes and an image attribute indicating a number of humans contained in the first image,
(c) a collection including all preceding attributes and image attributes indicating a number of humans contained in the first image who are static and a number of humans contained in the first image who are in motion,
(d) a collection including all preceding attributes and image attributes indicating age categories of the humans contained in the first image,
(e) a collection including all preceding attributes and image attributes indicating genders of the humans contained in the first image, and
(f) a collection including all preceding attributes and image attributes indicating whether the humans contained in the first image are associated with accessories, a stroller, glasses, a beard, a tie, a brief-case, or a suitcase;
store, in a geographic data collection, signage device information data specifying a location of each of the plurality of signage devices; and
store, in a content item data collection, content items each specify descriptive information of a respective media content object, the descriptive information including a storage link indicating a storage location of the respective media content object in a media store;
the media store having a processor and a memory, configured to store media content objects each retrievable by a storage link;
a demographic information server that receives the generated demographic data from the plurality of signage devices;
a front end server, when executed at the processor, configured to
send a user input interface to a remote computing device, wherein the user input interface is configured to
receive first campaign parameters from a user for building a first campaign, wherein the first campaign parameters comprise target demographic parameters, wherein the first campaign defines a plurality of media content items and claims a group of the signage devices and a plurality of timeslots on the claimed group of the signage devices such that the plurality of media content items are displayed at the claimed timeslots on the claimed group of the signage devices, obtain and display candidate timeslots of candidate signage devices for displaying media content, and receive an instruction from the user to claim all of the candidate timeslots of the candidate signage devices for the first campaign; and a deployment module, when executed at the processor, configured to receive the first campaign parameters from the user input interface executed at the remote computing device, query the demographic information server to obtain location parameters and time parameters that define locations and time periods at which a target demographic presents, respectively, based on the target demographic parameters;

examine the signage device information data stored in the data store and the location parameters of the first campaign parameters to select the candidate signage devices from the plurality of signage devices, examine the available timeslot information data stored in the data store and the time parameters of the first campaign parameters to select the candidate timeslots of the candidate signage devices from the available timeslots, determine a first subset of the candidate timeslots at one or more of the candidate signage devices, each timeslot of the first subset being designated for sale at a respective predetermined sale price, determine a second subset of the candidate timeslots at one or more of the candidate signage devices, each timeslot of the second subset being designated for bidding, receive a request to claim all of the first subset and the second subset of the candidate timeslots of the candidate signage devices from the user input interface executed at the remote computing device, generate first campaign deployment plan data of the first campaign, the first campaign deployment plan data including data specifying the claimed first subset and the second subset of the candidate timeslots at the one or more candidate signage devices, send the first campaign deployment plan data to the data store, the data store storing the first campaign deployment plan data as a data object to allocate all of the first subset and the second subset of the candidate timeslots at the one or more of the candidate signage devices to the first campaign, the central data module determining that all of the first subset and the second subset of the candidate timeslots at the one or more of the candidate signage devices are allocated to the first campaign based on the data object, examine the content item data collection to determine one or more content items that are available to the user, and obtain a subset of content items, including the plurality of media content items, of the one or more content items that are available to the user for use at the first subset and the second subset of the candidate timeslots at the one or more of the candidate signage devices, wherein the first campaign deployment plan data further specifies the subset of content items;

a digital signage control service (DSCS), when executed at the processor, configured to obtain the first campaign deployment plan data from the data store, generate a program list of the plurality of media content items based on the first campaign deployment plan data, and send the program list to the candidate signage devices such that the plurality of media content items are displayed on the candidate signage devices at the claimed candidate timeslots based on the program list, wherein the program list indicates storage links of the plurality of media content items.

20. The non-transitory computer readable medium of claim 19, wherein the available timeslot information data include sale timeslot information data specifying available timeslots of the plurality of signage devices and each for sale at a predetermined respective sale price;

wherein the codes further comprise a quotation calculator configured to obtain from the data store the sale price of a given timeslot for sale;

wherein the deployment module is configured to obtain from the quotation calculator a sale price for each timeslot in the first subset, and calculate a total price including a cost for claiming all the timeslots in the first subset;

wherein the front end server is configured to obtain from the deployment module price data specifying the total price and send the price data to the user input interface, and instruct the user input interface to display a input option that allows the user to accept the total price for claiming all of the candidate timeslots of the candidate signage devices.

21. The non-transitory computer readable medium of claim 20, wherein the data store is configured to store claimed timeslot information data specifying timeslots of the plurality of signage devices that are claimed by a campaign;

wherein the deployment module is configured to request the quotation calculator to claim a first timeslot in the first subset for the first campaign, update the first campaign deployment plan data to include the first timeslot, request the quotation calculator to claim each timeslot of the first subset for the first campaign, and request the quotation calculator to place a bid on each timeslot of the second subset for the first campaign;

wherein the quotation calculator is configured to receive a request to claim the first timeslot for the first campaign, instruct the data store to update the claimed timeslot information data to specify that the first timeslot is claimed by the first campaign, and instruct the data store to update the sale timeslot information data to remove the first timeslot.

22. The non-transitory computer readable medium of claim 20, wherein the available timeslot information data include bid timeslot information data specifying available timeslots of the plurality of signage devices and each for bidding at a respective bid price;

wherein the quotation calculator is configured to obtain from the data store the bid price of a given timeslot for bidding;

wherein the deployment module is configured to obtain from the quotation calculator a bid price for each timeslot in the second subset, and calculate the total price including a cost for placing bids on all the timeslots in the second subset;

wherein the front end server is configured to instruct the user input interface to display a input option that allows the user to accept the total price for claiming and placing bids on all of the candidate timeslots of the candidate signage devices.

23. The non-transitory computer readable medium of claim 22, wherein the deployment module is configured to request the quotation calculator to place a bid on a second timeslot of the second subset for the first campaign;

wherein the quotation calculator is configured to receive a request to place a bid on the second timeslot for the first campaign and a bid on the second timeslot for a second campaign, and instruct the data store to update the bid timeslot information data to specify that a bid for the first campaign and a bid for the second campaign are placed on the second timeslot.

24. The non-transitory computer readable medium of claim 23, wherein the data store is configured to store claimed timeslot information data specifying timeslots of the plurality of signage devices that are claimed by a campaign, wherein the bid timeslot information data specify a bid period for each of the timeslots for bidding;

wherein the quotation calculator is configured to examine the bid timeslot information data to determine whether the bid period for the second timeslot has expired, in response to determining that the bid period for the second timeslot has expired, instruct the data store to update the claimed timeslot information data to specify that the second timeslot is claimed by a winning campaign which placed a highest bid on the second timeslot, instruct the data store to update the bid timeslot information data to remove the second timeslot, send to the deployment module data specifying the winning campaign and the second timeslot, and send a notification to the deployment module, the notification specifying that the second campaign has placed a bid on the second timeslot higher than the bid placed on the second timeslot by the first campaign; and wherein the deployment module is configured to update a campaign deployment plan data of the winning campaign to include the second timeslot, and in response to the notification, request the quotation calculator to place another bid on the second timeslot for the first campaign, the another bid being higher than the bid placed by the second campaign.

25. The non-transitory computer readable medium of claim 19, wherein the deployment module is configured to determine whether all the candidate timeslots have been successfully claimed for the first campaign.

* * * * *